(12) United States Patent
Zhang et al.

(10) Patent No.: US 12,155,605 B2
(45) Date of Patent: *Nov. 26, 2024

(54) METHODS FOR TRANSMISSION AND RECEPTION OF CONTROL INFORMATION IN A COORDINATED SYSTEM

(71) Applicant: ZTE Corporation, Guangdong (CN)

(72) Inventors: Nan Zhang, Guangdong (CN); Yu Ngok Li, Guangdong (CN); Yijian Chen, Guangdong (CN); Zhaohua Lu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/666,277

(22) Filed: Feb. 7, 2022

(65) Prior Publication Data

US 2022/0158812 A1 May 19, 2022

Related U.S. Application Data

(63) Continuation of application No. 16/716,293, filed on Dec. 16, 2019, now Pat. No. 11,245,511, which is a
(Continued)

(51) Int. Cl.
*H04L 5/00* (2006.01)
*H04B 7/024* (2017.01)
(Continued)

(52) U.S. Cl.
CPC ........... *H04L 5/0094* (2013.01); *H04B 7/024* (2013.01); *H04L 5/0005* (2013.01);
(Continued)

(58) Field of Classification Search
CPC ... H04L 5/0094; H04L 5/0005; H04L 5/0035; H04W 72/23; H04W 72/12; H04B 7/024
See application file for complete search history.

(56) References Cited

U.S. PATENT DOCUMENTS

| 10,743,306 | B2 | 8/2020 | Wikström |
| 2009/0185526 | A1 | 7/2009 | Barber et al. |

(Continued)

FOREIGN PATENT DOCUMENTS

| CA | 3095641 A1 * | 12/2018 | ............. H04B 7/024 |
| CN | 1806401 A | 7/2006 | |

(Continued)

OTHER PUBLICATIONS

International Search Report and Written Opinion mailed on Mar. 14, 2018 for International Application No. PCT/CN2017/088791, filed on Jun. 16, 2017 (7 pages).

(Continued)

*Primary Examiner* — Khai M Nguyen
(74) *Attorney, Agent, or Firm* — Perkins Coie LLP

(57) ABSTRACT

A wireless communication method, comprising: forming M groups of data transmission configurations, wherein the $m^{th}$ group of data transmission configuration corresponds to the data transmission scheduled by a maximum number of $K_m$ control information sets, where M>0, m=1, ... , M and $K_m$>0, defining one or more transmission settings for said M groups of data transmission configurations, allocating resources among the one or more transmission settings, generating one or more control information sets associated with said one or more transmission settings, transmitting the one or more control information sets to a wireless network.

16 Claims, 20 Drawing Sheets

Related U.S. Application Data continuation of application No. PCT/CN2017/088791, filed on Jun. 16, 2017.

(51) Int. Cl.
  *H04W 72/12* (2023.01)
  *H04W 72/23* (2023.01)

(52) U.S. Cl.
  CPC ........... *H04L 5/0035* (2013.01); *H04W 72/12* (2013.01); *H04W 72/23* (2023.01)

(56) References Cited

U.S. PATENT DOCUMENTS

| | | |
|---|---|---|
| 2012/0020303 A1 | 1/2012 | Barber et al. |
| 2012/0182910 A1 | 7/2012 | Nakashima et al. |
| 2012/0324041 A1 | 12/2012 | Gerber et al. |
| 2013/0155962 A1 | 6/2013 | Hakola et al. |
| 2014/0161130 A1 | 6/2014 | Luciani |
| 2016/0066305 A1 | 3/2016 | Chae et al. |
| 2016/0248561 A1* | 8/2016 | Davydov ............... H04L 5/0048 |
| 2019/0260537 A1* | 8/2019 | Seo ....................... H04W 72/21 |
| 2020/0119897 A1 | 4/2020 | Zhang et al. |
| 2020/0127786 A1 | 4/2020 | Kwak et al. |
| 2020/0235867 A1 | 7/2020 | Choi et al. |

FOREIGN PATENT DOCUMENTS

| | | | |
|---|---|---|---|
| CN | 101523942 A | 9/2009 | |
| CN | 101765184 A | 6/2010 | |
| CN | 101971693 A | 2/2011 | |
| CN | 103733711 A | 4/2014 | |
| CN | 106385309 A | 2/2017 | |
| ES | 2900271 T3 * | 3/2022 | ........... H04L 5/0032 |
| WO | 2015113295 A1 | 8/2015 | |
| WO | WO-2017056356 A1 * | 4/2017 | ......... G06F 19/3481 |
| WO | WO-2017079544 A1 * | 5/2017 | ........... H04B 7/0626 |
| WO | WO-2017095470 A1 * | 6/2017 | ........... H04L 5/0023 |

OTHER PUBLICATIONS

Canadian Office Action mailed Nov. 2, 2021 for Canadian Patent Application No. 3,095,641, filed on Jun. 16, 2017 (4 pages).
Singapore Written Opinion mailed Dec. 13, 2021 for Singapore Patent Application No. 11202009512V, filed on Jun. 16, 2017 (7 pages).
Media Tek Inc. "Multi-TRP and Multi-panel transmission," 3GPP TSG RAN WG1 Meeting #88bis, Hangzhou, China, R1-1707837, 4 pages, May 15-19, 2017.
Chinese Office Action mailed Nov. 24, 2021 for Chinese Patent Application No. 2017800913100, filed on Jun. 16, 2017 (7 pages).
Co-Pending Canadian Application No. 3,095,641, Canadian Notice of Allowance dated Oct. 21, 2022, 1 page.
Co-pending Chinese Application No. 201780091310.0, Chinese Office Action dated Jul. 29, 2022, 10 pages with unofficial translation.
CATT, "Discussion on contents of scheduling assignment," 3GPP TSG RAN WG1 #86, Gothenburg, Sweden, R1-166434, Aug. 22-26, 2016, 6 pages.
InterDigital Communications, "PDSCH rate-matching for A-CSI-RS," 3GPP TSG RAN WG1 #86bis, Lisbon, Portugal, R1-1610105, Oct. 10-14, 2016, 3 pages.
InterDigital Inc., "PDSCH starting position in NR," 3GPP TSG RAN WG1 #89, Hangzhou, China, R1-1709020, May 15-19, 2017, 2 pages.
Guangdong OPPO Mobile Telecom, "On resource sharing between PDCCH and PDSCH," 3GPP TSG RAN WG1 #89, Hangzhou, China, R1-1707708, May 15-19, 2017, 6 pages.
Samsung, "Signaling for NR-PDCCH and PDSCH Multiplexing," 3GPP TSG RAN WG1 #89, Hangzhou, China, R1-1707994, May 15-19, 2017, 3 pages.
Li, C. et al., U.S. Appl. No. 62/501,945, filed May 5, 2017, 6 pages.
CNIPA, Third Office Action for Chinese Application No. 201780091310.0, mailed on Feb. 1, 2023, 7 pages with unofficial translation.
CNIPA, Notification to Complete Formalities of Registration for Chinese Patent Application No. 201780091310.0, mailed on Apr. 28, 2023, 4 pages with unofficial translation.

* cited by examiner

METHODS FOR TRANSMISSION AND RECEPTION OF CONTROL INFORMATION IN A COORDINATED SYSTEM

CROSS REFERENCE TO RELATED APPLICATIONS

This patent document is a continuation of and claims priority to U.S. patent application Ser. No. 16/716,293, filed Dec. 16, 2019, which is a continuation of International Patent Application No. PCT/CN2017/088791, filed on Jun. 16, 2017. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a much more complex range of access requirements and flexibilities.

SUMMARY

This disclosure relates to methods, systems, and devices for transmitting overhead control information from a base station to a mobile station such that the mobile station may support receiving multiple control and data channels on the downlink, schedule the uplink data transmission, and schedule the channel state information (CSI) calculation on the downlink.

In one exemplary aspect, a wireless communication method is disclosed. The method comprises forming M groups of data transmission configurations, wherein the $m^{th}$ group of data transmission configuration corresponds to the data transmission scheduled by a maximum number of $K_m$ control information sets, where M>0, m=1, . . . , M and $K_m$>0, defining one or more transmission settings for said M groups of data transmission configurations, allocating number of data layers among the one or more transmission settings, generating one or more control information sets associated with said one or more transmission settings, and transmitting the one or more control information sets to a wireless network.

In one exemplary aspect, a wireless communication method is disclosed. The method comprises forming M groups of data transmission configurations, wherein the $m^{th}$ group of data transmission configuration corresponds to the data transmission scheduled by a maximum number of $K_m$ control information sets, where M>0, m=1, . . . , M and $K_m$>0, defining one or more transmission settings for said M groups of data transmission configurations, allocating resources among the one or more transmission settings, generating one or more control information sets associated with said one or more transmission settings, and transmitting the one or more control information sets to a wireless network.

In another exemplary aspect, a wireless communication method is disclosed. The method comprises forming M groups of data transmission configurations, wherein the $m^{th}$ group of data transmission configuration corresponds to the data transmission scheduled by a maximum number of $K_m$ control information sets, where M>0, m=1, . . . , M and $K_m$>0, defining one or more transmission settings for said M groups of data transmission configurations, allocating number of data layers among the one or more transmission settings, generating one or more control information sets associated with said one or more transmission settings, and receiving the one or more control information sets from a wireless network.

In another exemplary aspect, a wireless communication method is disclosed. The method comprises forming M groups of data transmission configurations, wherein the $m^{th}$ group of data transmission configuration corresponds to the data transmission scheduled by a maximum number of $K_m$ control information sets, where M>0, m=1, . . . , M and $K_m$>0, defining one or more transmission settings for said M groups of data transmission configurations, allocating resources among the one or more transmission settings, generating one or more control information sets associated with said one or more transmission settings, and receiving the one or more control information sets from a wireless network.

In yet another exemplary aspect, a wireless communication method is disclosed. The method comprises forming M groups of measurement configurations, wherein the $m^{th}$ group of measurement configuration corresponds to the measurement scheduled by a maximum number of $K_m$ control information sets, where M>0, m=1, M and $K_m$>0, defining one or more settings for said M groups of measurement configurations, generating one or more control information sets associated with the allocated number of settings within each group, and transmitting the one or more control information sets to a wireless network.

In yet another exemplary aspect, a wireless communication method is disclosed. The method comprises forming M groups of measurement configurations, wherein the $m^{th}$ group of measurement configuration corresponds to the measurement scheduled by a maximum number of $K_m$ control information sets, where M>0, m=1, . . . , M and $K_m$>0, defining one or more settings for said M groups of measurement configurations, generating one or more control information sets associated with the allocated number of settings within each group, and receiving the one or more control information sets from a wireless network.

In one exemplary aspect, a wireless communication method is disclosed. The method comprises forming M groups of data transmission configurations, wherein the $m^{th}$ group of data transmission configuration corresponds to the data transmission scheduled by a maximum number of $K_m$ control information sets, where M>0, m=1, . . . , M and $K_m$>0, defining one or more transmission settings for said M groups of data transmission configurations, allocating number of data layers among the one or more transmission settings, generating one or more control information sets associated with said one or more transmission settings, transmitting the one or more control information sets to a wireless network, receiving the one or more control information sets from a wireless network, and scheduling the corresponding responding data transmissions.

In one exemplary aspect, a wireless communication method is disclosed. The method comprises forming M groups of data transmission configurations, wherein the $m^{th}$ group of data transmission configuration corresponds to the data transmission scheduled by a maximum number of $K_m$ control information sets, where M>0, m=1, . . . , M and $K_m>0$, defining one or more transmission settings for said M groups of data transmission configurations, allocating resources among the one or more transmission settings, generating one or more control information sets associated with said one or more transmission settings, transmitting the one or more control information sets to a wireless network, receiving the one or more control information sets from a wireless network, and scheduling the corresponding responding data transmissions.

In yet another exemplary aspect, a wireless communication base station is disclosed. The wireless communication base station comprises a memory that stores instructions for operations of the base station, and a processor in communication with the memory operable to execute instructions to cause the base station to transmit in a transmission that includes one or more slots, a message indicative of control information, wherein the control information contains information necessary to enable substantially simultaneous demodulation and decoding of both the overhead control information and the associated data.

In yet another exemplary aspect, a wireless communication mobile station is disclosed. The wireless communication mobile station comprises a memory that stores instructions for operations of the mobile station, and a processor that is in communication with the memory and operable to execute the instructions to cause the mobile station to receive, in a transmission that includes one or more slots, a message indicative of control information, wherein the control information contains information necessary to enable the substantially simultaneous demodulation and decoding of both the overhead control information and the associated data.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWINGS

FIG. 1A-1 shows an exemplary diagram of a mobile station (UE) receiving multiple control information sets (PDCCH) and the associated data (PDSCH) from multiple antenna groups within a single transmission point.

FIG. 1B-1 shows a diagram of a mobile station (UE) receiving a control information set (PDCCH) from a single transmission point and the associated data (PDSCH) from multiple antenna groups from a single transmission point.

FIG. 4-1 illustrates an example of division of the downlink channel into a control region and data region, with the data region further divided in sub-regions.

FIG. 4-2 illustrates an example of division of the downlink channel into a control region and data region, with no further subdivision of the data region.

FIG. 13A-1 shows an exemplary diagram of a mobile station (UE) receiving multiple control information sets (PDCCH) from multiple antenna groups within a single transmission point and the UE transmitting back to the transmission point multiple control information sets (PUCCH) and the associated uplink data (PUSCH) to the corresponding antenna group.

FIG. 13B-1 shows an exemplary diagram on a mobile station (UE) receiving a control information set (PDCCH) from a single transmission point with multiple antenna groups with the PDCCH being transmitted by only one of the antenna groups and the UE transmitting back to the multiple antenna groups of the transmission point the associated uplink control information set (PUCCH) and the associated uplink data (PUSCH).

FIG. 16-1 illustrates an example division of the uplink channel data region corresponding to the control information sets in the downlink control region, with the uplink channel data region further divided into sub-regions.

FIG. 16-2 illustrates an example of the uplink channel data region corresponding to the control information sets in the downlink control region, with no subdivision of the uplink channel data region.

DETAILED DESCRIPTION

The rapid growth of mobile communications and advances in technology has led to greater demand for capacity and peak data rates. Other aspects, such as energy consumption, device cost, spectral efficiency, cost per delivered bit, throughput, and latency are also important to the success of future wireless networks.

Figure 1A:
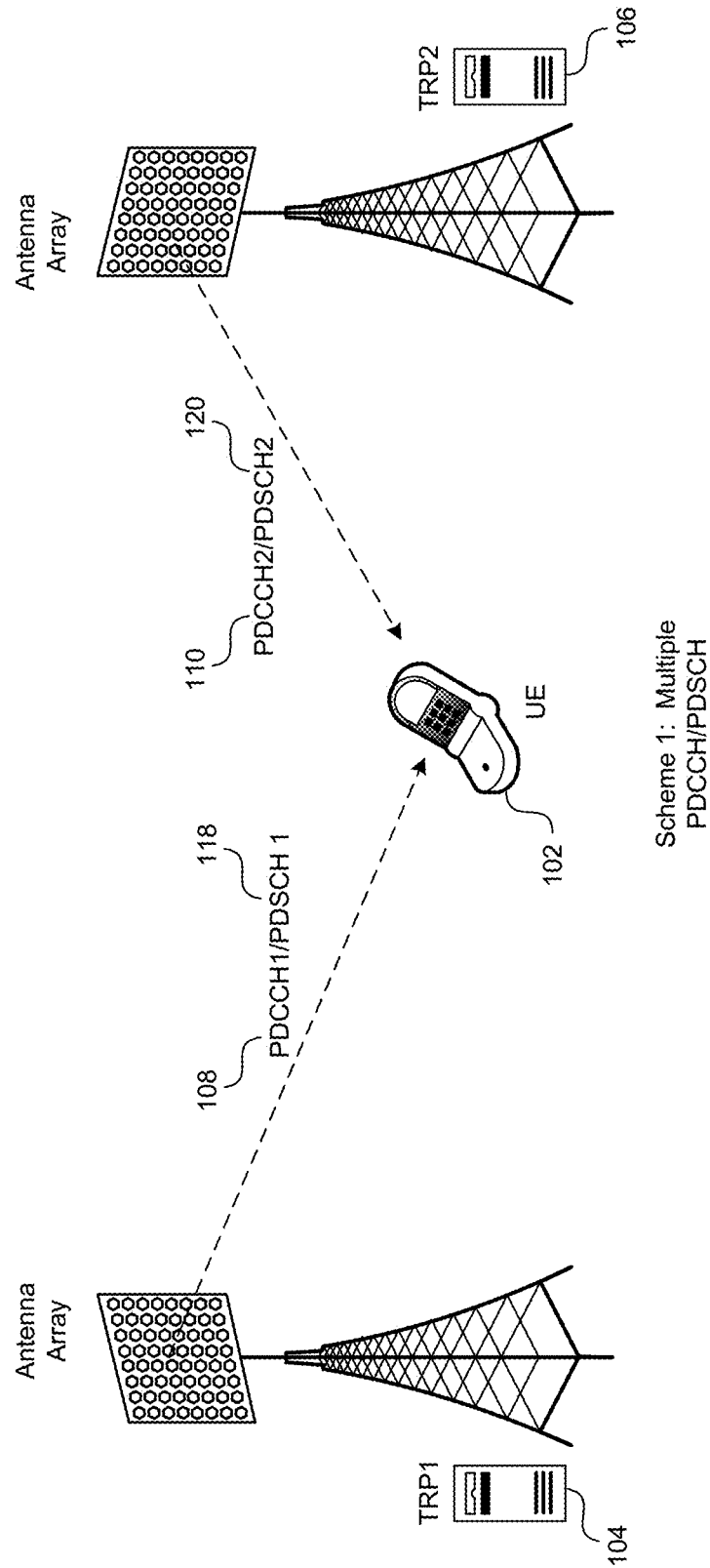
FIG. 1A shows an exemplary diagram of a mobile station (UE) receiving multiple control information sets (PDCCH) and the associated data (PDSCH) from multiple transmission points.
Figures 1, 1A:
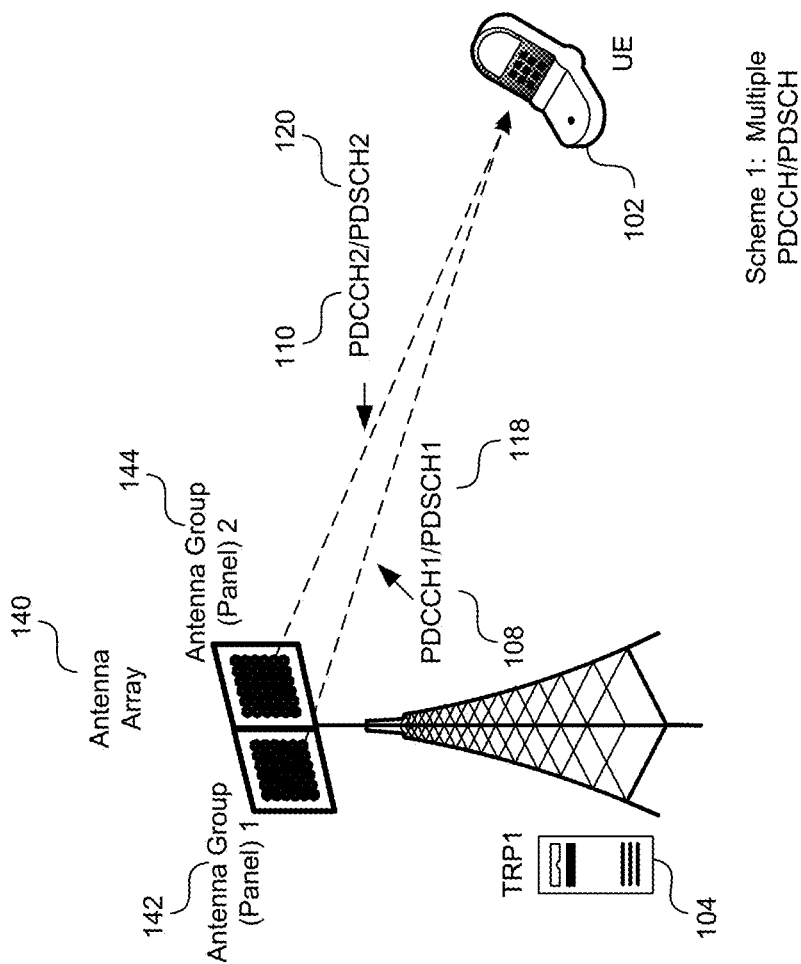
Figure 1B:
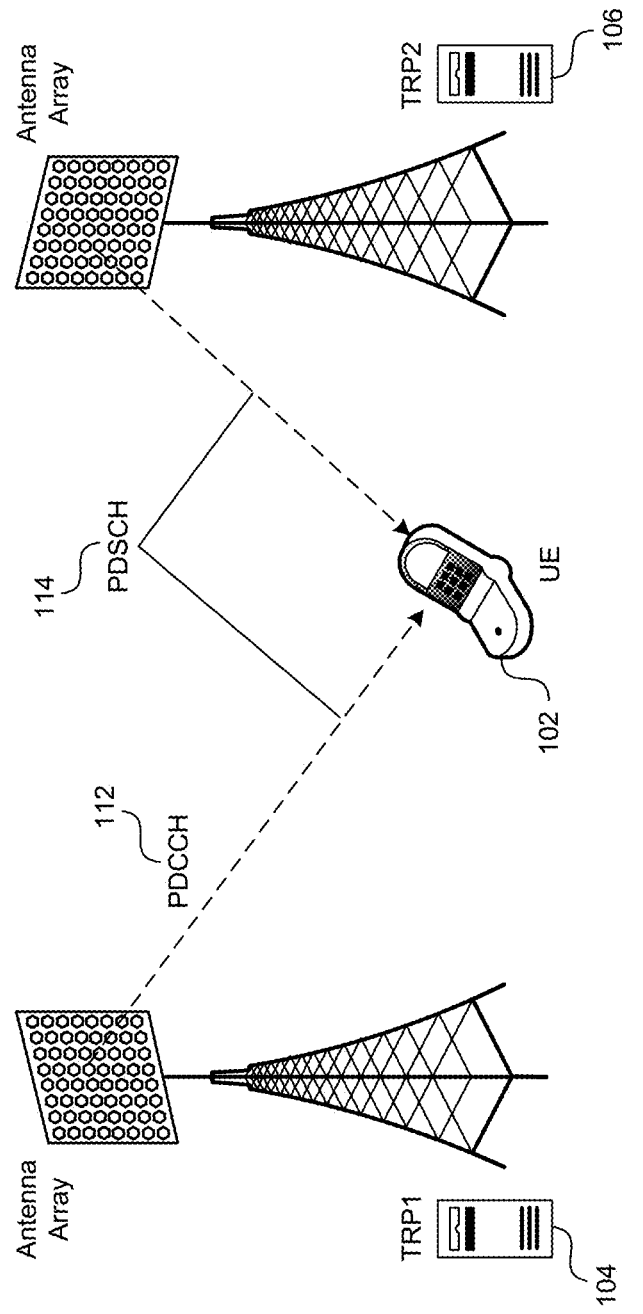
FIG. 1B shows a diagram of a mobile station (UE) receiving a control information set (PDCCH) from a single transmission point and the associated data (PDSCH) from multiple transmission points, in accordance with some embodiments.
Figures 1, 1B:
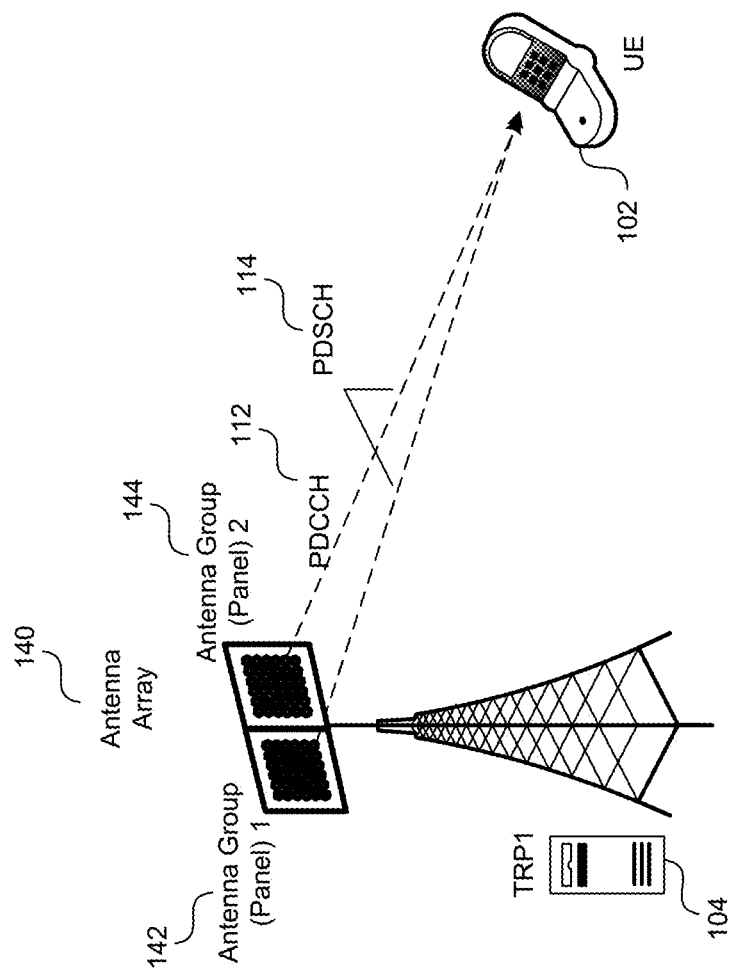

In this disclosure the term "transmission unit" (TRU) refers to a unit from which the data can be transmitted. A coordinated transmission can be conducted among multiple TRU's, whether that coordinated transmission arises from a mobile station (UE) in communication with two or more non-co-located transmission points (in this example the TRU encompasses the transmission points (TRP's) 104 and 106, as illustrated in FIG. 1A and FIG. 1B), or a mobile station (UE) 102 in communication with two or more antenna panels or any combination of antenna elements within single transmission point (in this example the TRU encompasses the antenna array 140, as illustrated in FIG. 1A-1 and FIG. 1B-1).

The term "transmission techniques" refers to different multiple-antenna schemes, e.g., diversity, multiplexing with different maximal supported layers, beamforming, or transmission with single or multiple PDCCH/PDSCH, or from single or multiple TRU's.

The term "exemplary" is used to mean "an example of" and, unless otherwise stated, does not imply an ideal or a preferred embodiment.

In next generation systems, such as the 5G New Radio systems (5G-NR), to increase bandwidth and throughput to the mobile station (UE), support of substantially simultaneous reception of multiple PDCCH/PDSCH's at the UE may be desirable when possible.

In current LTE systems, coordinated multipoint (CoMP) transmission such as inter-cell interference cancellation (ICIC) or Dynamic Point Selection (DPS) or Dynamic Point Blanking (DPB) or non-coherent Joint Transmission (NCJT) may be used to alleviate the co-channel interference problem among different transmission points (TRP). Using these methods, joint data transmission from multiple TRP's is possible. However, current systems allow only for the mobile station to receive a single PDCCH from the host transmission unit, while the data on the PDSCH may be jointly transmitted.

In this document, examples with various levels of details are set forth to illustrate aspects of the presently disclosed technology.

For example, when supporting a mobile station (UE) to receive multiple PDCCH's and PDSCH's from multiple TRP's or from multiple antenna panels located at a single TRP, it is useful to coordinate the allocation of resources, e.g., number of layers, RS resources, for each PDCCH/PDSCH associated with the various TRP's. Meanwhile, it is useful to find a proper allocation of resources to support substantially simultaneous reception of the PDCCH and PDSCH at the mobile station (UE) based on reported UE capability, while still maintaining backwards compatibility. And relatedly, it is useful to have a scheme wherein the mobile station (UE) can identify, and properly demodulate and decode the multiple PDCCH's such that the UE can support substantially simultaneous reception of the PDCCH and PDSCH and substantially simultaneous transmission of PUCCH and PUSCH.

In yet another example, when supporting a mobile station (UE) to transmit multiple PUCCH's and PUSCH's from multiple antenna panels located at the UE based on the received PDCCH's, it is useful to coordinate the allocation of resources, e.g. number of layers, RS resources for each PUCCH/PUSCH associated with the various downlink control information (DCI). Meanwhile, it is also useful to find a proper allocation of resources to support the substantially simultaneous transmission of the PUCCH and PUSCH at the mobile station (UE) based on the reported UE capability, while still maintaining backwards capability.

In yet another example, when supporting a mobile station (UE) to receive multiple PDCCH's from multiple TRP's or from multiple antenna panels located at a single TRP, it is useful to coordinate the settings, e.g., RS settings, reporting settings, for each PDCCH associated with the various TRP's. Meanwhile, it is useful to find a proper allocation of settings to support the measurement of channel state information at the mobile station (UE) based on reported UE capability, while still maintaining backwards compatibility. And relatedly, it is useful to have a scheme wherein the mobile station (UE) can identify, and properly demodulate and decode the multiple PDCCH's such that the UE can support substantially simultaneous reception of the PDCCH and calculation of channel state information.

Thus, utilizing the technology disclosed, next generation systems, such as the 5G New Radio systems (5G-NR), may increase bandwidth and throughput to the mobile station (UE) through support of substantially simultaneous reception of multiple PDCCH/PDSCH's when possible.

The specifics in the described examples should not be construed as limitations on the scope of the disclosed technology or what may be claimed, but rather as descriptions of features that may or may not be specific to particular embodiments of specific disclosed technology. Certain features that are described in this document are in the context of separate embodiments may also be implemented in combination in a single embodiment. Conversely, features that are described in the context of a single embodiment may also be implemented in multiple embodiments separately or in any suitable combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this disclosure should not be understood as requiring such separation in all embodiments.

For example FIG. 1A shows a mobile station (UE) 102 in a wireless network in communication with two transmission points (TRP's) 104 and 106 utilizing the technology disclosed enabling the UE to receive multiple PDCCH's 108 and 110 and PDSCH's 118 and 120 substantially simultaneously from transmission points (TRP's) 104 and 106, through the aforementioned CoMP techniques. FIG. 1A-1 shows a mobile station (UE) 102 in a wireless network in communication with a transmission point 104 with an antenna array 140 consisting of two separate antenna groups (panels) 142 and 144 utilizing the technology disclosed enabling the UE to receive multiple PDCCH's 108 and 110 and PDSCH's 118 and 120 substantially simultaneously from the transmission point 104 through the aforementioned CoMP techniques.

FIG. 1B shows a mobile station (UE) 102 in a wireless network in communication with two transmission points (TRP's) 104 and 106, utilizing the technology disclosed but for backwards compatibility purposes, receiving a single PDCCH 112 from the host transmission unit assigned to transmission point 104, but still receiving the PDSCH 114 jointly from both transmission points (TRP's) 104 and 106 through the aforementioned CoMP techniques. FIG. 1B-1 shows a mobile station (UE) 102 in a wireless network in communication with a transmission point 104 with an antenna array 140 consisting of two separate antenna groups (panels), utilizing the technology disclosed but for backwards compatibility purposes, receiving a single PDCCH 112 from the host transmission unit assigned to transmission point 104 antenna group (panel) 144, but still receiving the PDSCH 114 jointly from both antenna groups (panels) 142 and 144 of the transmission point 104.

Figure 13A:
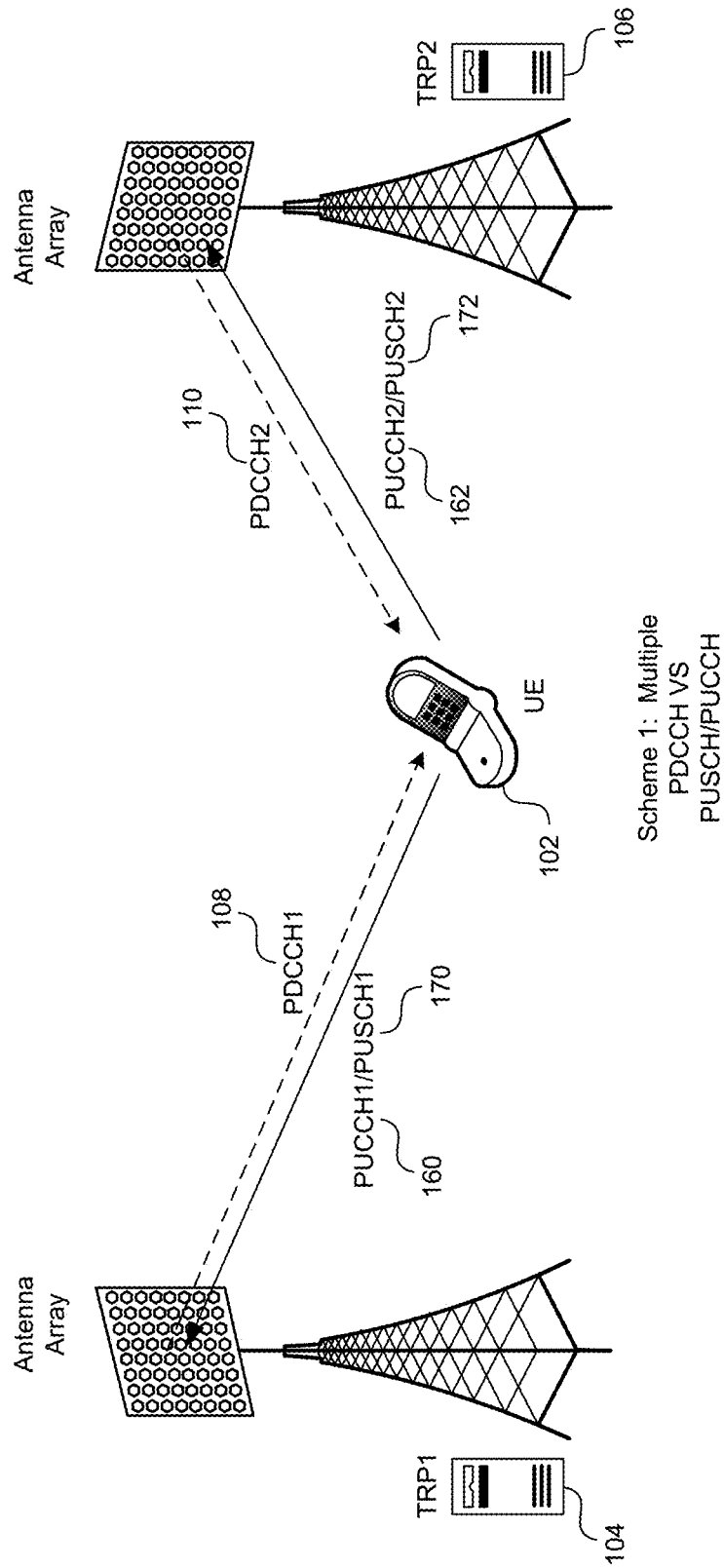
FIG. 13A shows an exemplary diagram of a mobile station (UE) receiving multiple control information sets (PDCCH) from multiple transmission points and the UE transmitting back to the corresponding transmission points the associated uplink control information sets (PUCCH) and the associated uplink data (PUSCH).
Figures 1, 13A:
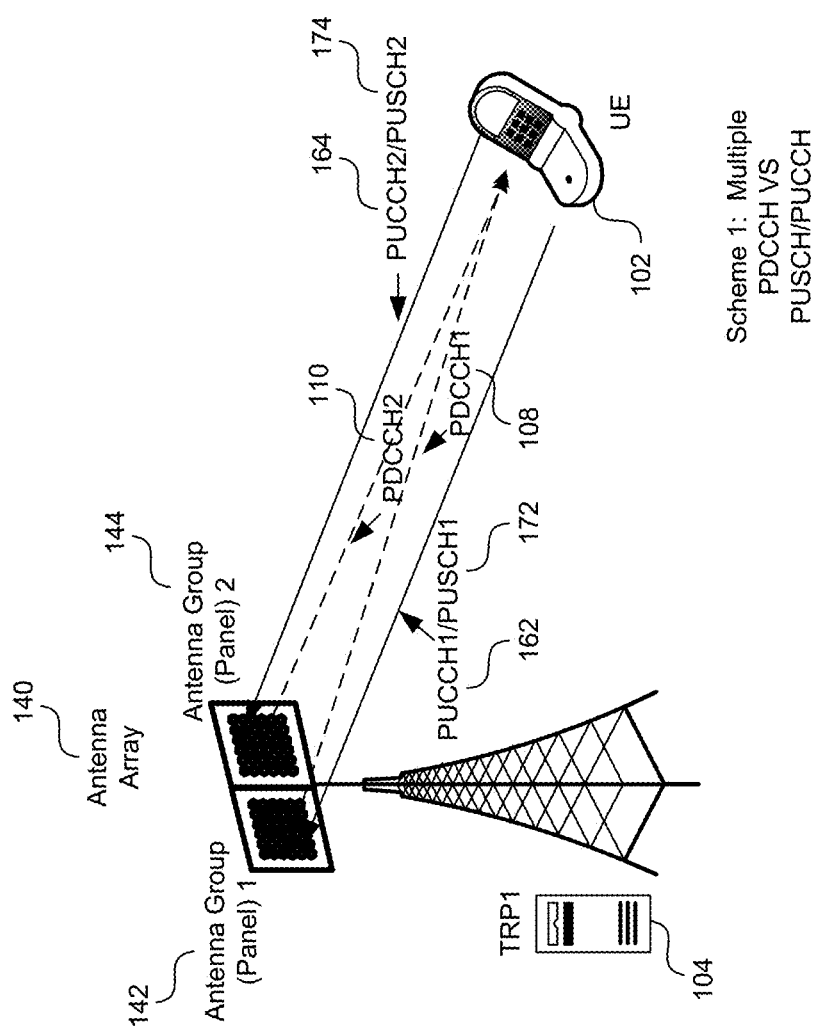

FIG. 13A shows a mobile station (UE) 102 in a wireless network in communication with two transmission points (TRP's) 104 and 106 utilizing the technology disclosed enabling the UE to receive multiple PDCCH's 108 and 110 substantially simultaneously, through the aforementioned CoMP techniques and the UE transmitting multiple PUCCH's 160 and 162 and corresponding PUSCH's 170 and 172 to the corresponding transmission points (TRP's) 104 and 106. FIG. 13A-1, shows a mobile station (UE) 102 in a wireless network in communication with a transmission point 104 with an antenna array 140 consisting of two separate antenna groups (panels) 142 and 144 utilizing the technology disclosed enabling the UE to receive multiple PDCCH's 108 and 110 substantially simultaneously from the transmission point 104 through the aforementioned CoMP techniques and the UE transmitting multiple PUCCH's 162 and 164 and corresponding PUSCH's 172 and 174 to the corresponding antenna groups (panels) 142 and 144 at the transmission point 104.

Figure 13B:
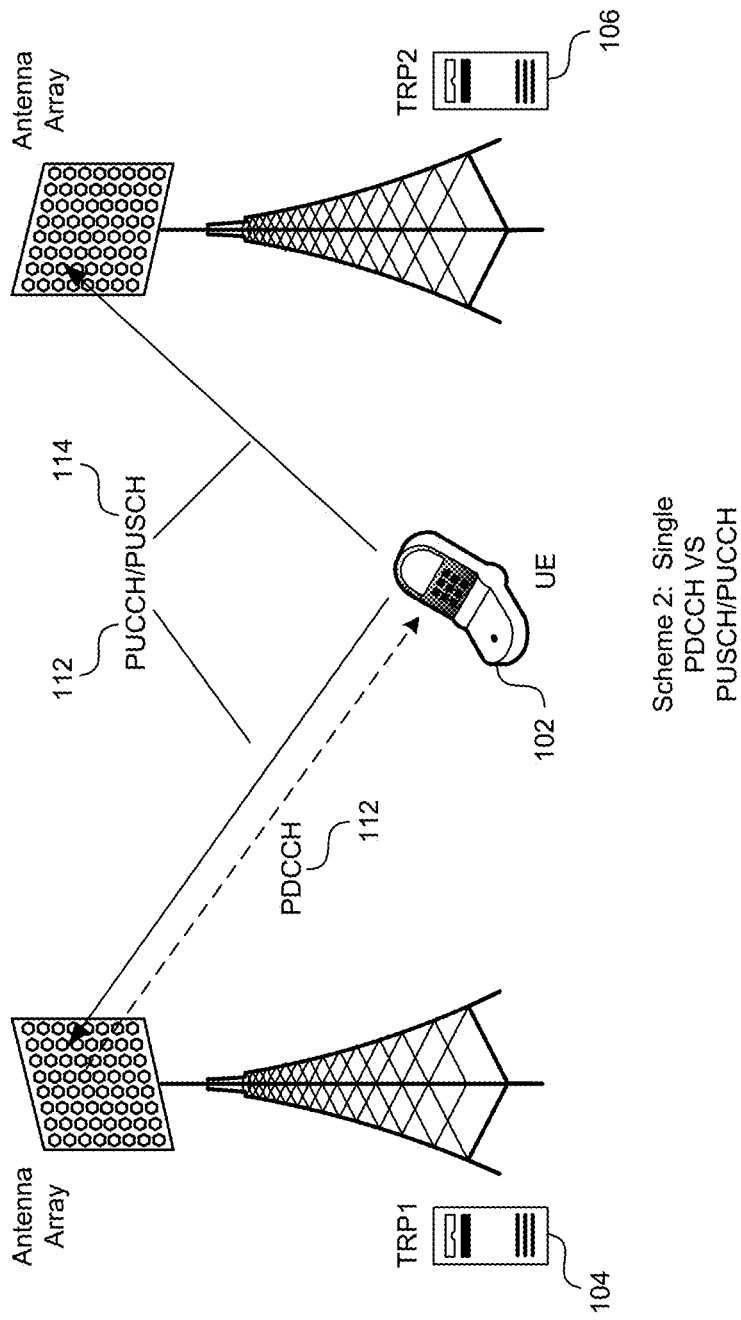
FIG. 13B shows an exemplary diagram of a mobile station (UE) receiving a control information set (PDCCH) from a single transmission point and the UE transmitting back to both transmission points the associated uplink control information set (PUCCH) and the associated uplink data (PUSCH).
Figures 1, 13B:
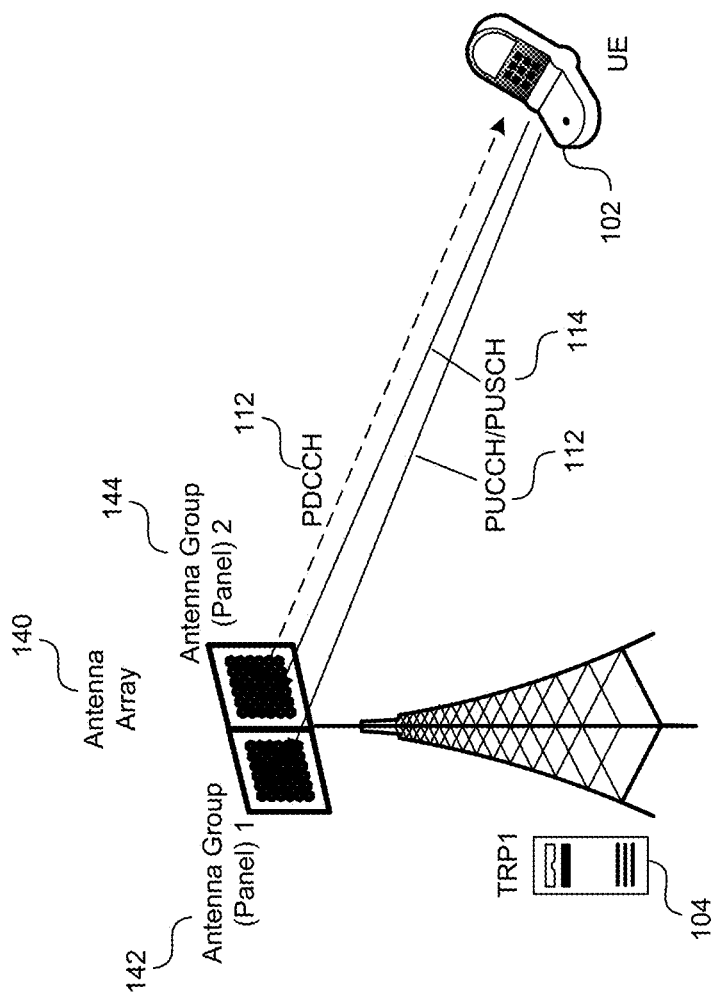

FIG. 13B shows a mobile station (UE) 102 in a wireless network in communication with two transmission points (TRP's) 104 and 106, utilizing the technology disclosed but for backwards compatibility purposes, receiving a single PDCCH 112 from the host transmission unit assigned to transmission point 104, but transmitting the PUCCH and PUSCH to both transmission points (TRP's) 104 and 106. FIG. 13B-1 shows a mobile station (UE) 102 in a wireless network in communication with a transmission point 104 with an antenna array 140 consisting of two separate antenna groups (panels) 142 and 144, utilizing the technology disclosed but for backwards compatibility purposes, receiving a single PDCCH 112 from the host transmission unit assigned to transmission point 104 antenna group (panel) 144, but transmitting the PUCCH and PUSCH to both antenna panels of the transmission point 104.

Figure 2:
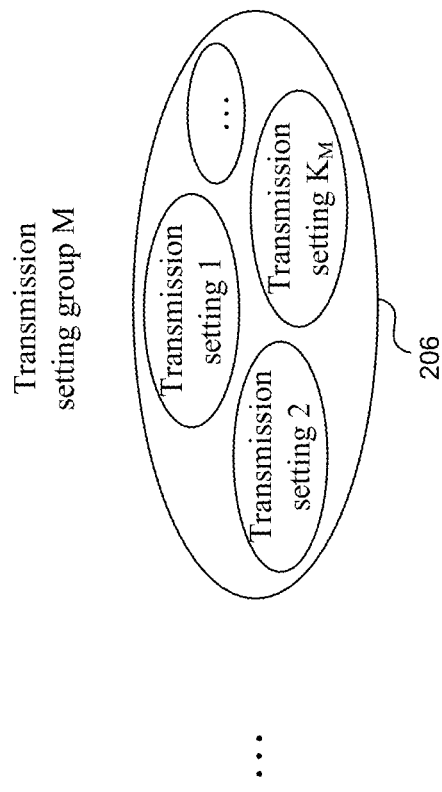
FIG. 2 shows an exemplary formation of transmission groups defining transmission settings as needed within each group.
Figure 2:
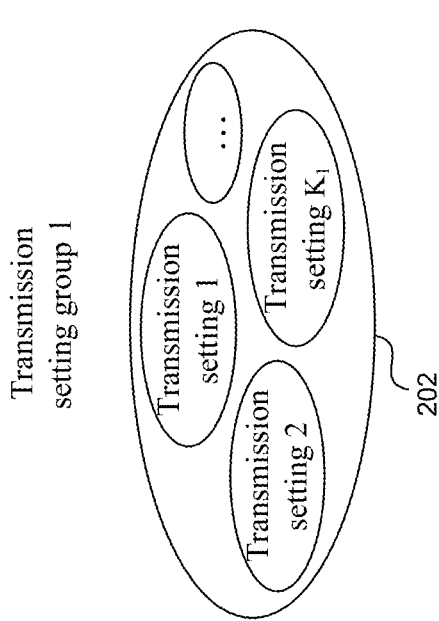

For example, to support the reception of multiple PDCCH and PDSCH as shown in FIG. 1A and the transmission of multiple PUCCH and PUSCH as shown in FIG. 13A, FIG. 2 illustrates the forming of transmission groups 202, ..., 206, where the transmission groups are formed based on various transmission techniques.

In some embodiments, when forming the transmission groups, the various transmission techniques that may be considered include but is not limited to: whether the data transmission is scheduled by single or multiple control information sets and whether the data transmission is from a single or multiple transmission units. Furthermore, in some embodiments defining the parameters of the transmission settings within a transmission group may be done jointly across the group. In some embodiments, defining the parameters of the transmission settings within a transmission group may be done separately without regards to other settings in the transmission group. In other embodiments the parameters of the transmission settings within a transmission group may be done independently.

In some embodiments allocating of the number of data layers to the various transmission settings in the transmission group can be done jointly based on UE's capability. For example in some embodiments, there are J transmission settings that need defining, each with its corresponding control information set. For each transmission setting, H layers are assigned to each transmission setting. The transmission settings within each transmission group may refer to the various settings and options in the wireless system including for example Radio Resource Control (RRC) configuration, MAC configuration, Downlink Control Information (DCI) format, the related search space, and/or the corresponding transmission scheme of the PDSCH corresponding to the associated PDCCH, which takes into account the MIMO capabilities of the mobile station (UE).

Defining $H_i$ as the number of layers assigned to the $i^{th}$ transmission setting for the transmission group, in some embodiments, a fixed number of layer(s) (e.g., $H_1$) are allocated to the first transmission setting. If scheduled data based on these transmission settings is to be received by the mobile station (UE) substantially simultaneously, the following condition should be satisfied:

$$\sum_{n=2}^{N} H_n = H - H_1 (H_n \geq 1),$$

where H is the maximum number of layers the UE supports. Taking into account the UE's capability with regards to the maximum number of layers it can support, the total number of layers assigned to each transmission setting, when summed together should not exceed $H-H_1$ in some embodiments, where $H_1$ is the number of layer(s) allocated to the first transmission setting. The remaining transmission settings may be configured according to the properties of the corresponding transmission group. In some embodiments the maximum number of layers the UE supports may be reported to the wireless network.

In some embodiments, transmission settings may be configured according to the properties of the transmission group with allocating the number of layers based on a semi-persistent coordination among the corresponding transmission units. If scheduled data based on these transmission settings is to be received by the mobile station (UE) substantially simultaneously, the following condition should be satisfied:

$$\sum_{n=1}^{N} H_n = H; (H_n \geq 1),$$

where H is the maximum number of layers the UE supports. In some embodiments, the maximum number of layers the UE supports may be reported to the wireless network. In some embodiments, the UE may report the maximum number of MIMO layers it supports for each PDSCH separately or together with the overall maximum number of MIMO layers it supports. Additionally, in some embodiments semi-persistent coordination may allow the mobile station (UE) to receive data on the PDSCH according to the pre-configured periodicity in the semi-persistent coordination configuration.

In some embodiments, if scheduled data based on these transmission settings is to be received by the mobile station (UE) substantially simultaneously, the following condition should be satisfied:

$$H_n \le H_n^T$$

and $$\sum_{n=1}^{N} H_n^T = H; (H_n \ge 1),$$

where H is the maximum number of layers the UE supports and $H_n^T$ is the maximum number of layer(s) the UE can support for the $n^{th}$ PDSCH/PDCCH from the corresponding TRU.

In some embodiments allocating of the number of data layers to the various transmission settings in the transmission group can be done jointly based on UE's capability. For example in some embodiments, there are N transmission settings that need defining, each with its corresponding control information set. For the $n^{th}$ transmission setting, $E_n$ layers are assigned. The transmission settings within each transmission group may refer to the various settings and options in the wireless system including for example Radio Resource Control (RRC) configuration, MAC configuration, Downlink Control Information (DCI) format, the related search space, and/or the corresponding transmission scheme of the PUSCH corresponding to the associated PDCCH, which takes into account the MIMO capabilities of the mobile station (UE).

Defining $E_i$ as the number of layers assigned to the $i^{th}$ transmission setting for the transmission group, in some embodiments, a fixed number of layer(s) (e.g., $E_1$) are allocated to the first transmission setting. If scheduled UL data based on these transmission settings is to be transmitted by the mobile station (UE) substantially simultaneously, the following condition should be satisfied:

$$\sum_{n=2}^{N} E_n = E - E_1 (E_n \ge 1),$$

where E is the maximum number of layers the UE supports. Taking into account the UE's capability with regards to the maximum number of layers it can support, the total number of layers assigned to each transmission setting, when summed together should not exceed E–$E_1$ in some embodiments, where $E_1$ is the number of layer(s) allocated to the first transmission setting. The remaining transmission settings may be configured according to the properties of the corresponding transmission group. In some embodiments the maximum number of layers the UE supports may be reported to the wireless network.

In some embodiments, transmission settings may be configured according to the properties of the transmission group with allocating the number of layers based on a semi-persistent coordination among the corresponding transmission units. If scheduled UL data based on these transmission settings is to be transmitted by the mobile station (UE) substantially simultaneously, the following condition should be satisfied:

$$\sum_{n=2}^{N} E_n = E; (E_n \ge 1),$$

where E is the maximum number of layers the UE supports. In some embodiments, the maximum number of layers the UE supports may be reported to the wireless network. In some embodiments, the UE may report the maximum number of MIMO layers it supports for each PUSCH separately or together with the overall maximum number of MIMO layers it supports. Additionally, in some embodiments semi-persistent coordination may allow the mobile station (UE) to transmit data on the PUSCH according to the pre-configured periodicity in the semi-persistent coordination configuration.

In some embodiments, if scheduled UL data based on these transmission settings is to be transmitted by the mobile station (UE) substantially simultaneously, the following condition should be satisfied:

$$E_n \le E_n^T$$

and $$\sum_{n=1}^{N} E_n^T = E;$$

$$(E_n \ge 1),$$

where E is the maximum number of layers the UE supports and $E_n^T$ is the maximum number of layer(s) the UE can support for the $n^{th}$ PUCCH/PUSCH to the corresponding TRU.

Figure 3:
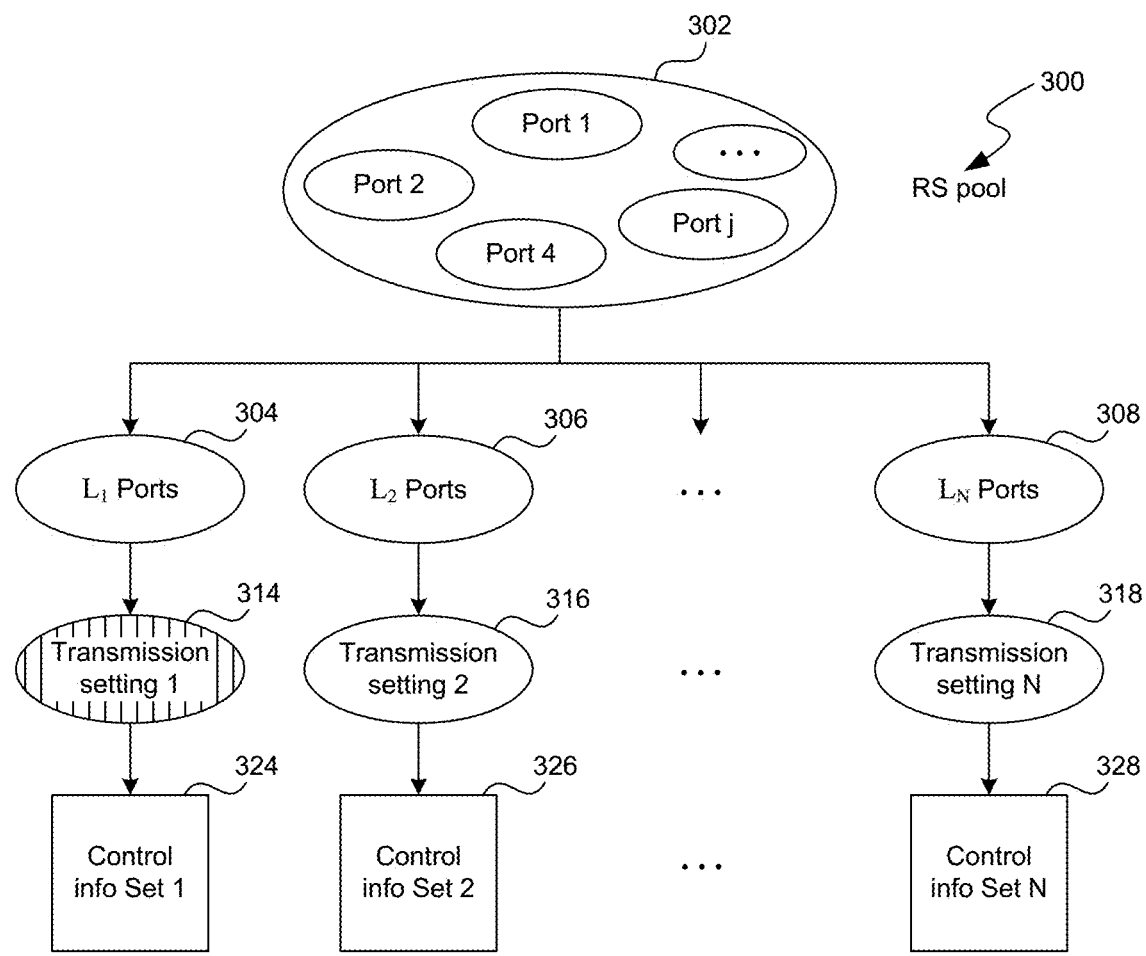
FIG. 3 shows an exemplary allocation of antenna resources/reference signals among the transmission settings along with the generation of the associated control information for the transmission settings.

FIG. 3 illustrates some embodiments of the allocating of RS resources to the various transmission settings in the transmission group. In FIG. 3, the various antenna ports 302 correspond to the overall set of reference signals (RS) 300. For example in some embodiments there may be a one-to-one correspondence between antenna ports and reference signals. There are N 314, 316, ..., 318 transmission settings that need defining, each with its corresponding control information set 324, 326, ..., 328. For the $n^{th}$ transmission setting, $L_n$ ports (with each port having its corresponding RS) 304, 306, ..., 308 are assigned to each transmission setting. In some embodiments, each of the ports in the RS pool is assigned to exclusively to one of the transmission settings. The transmission settings within each transmission group may refer to the various settings and options in the wireless system including for example Radio Resource Control (RRC) configuration, MAC configuration, Downlink Control Information (DCI) format, the related search space, and/or the corresponding transmission scheme of the PDSCH corresponding to the associated PDCCH, which takes into account the MIMO capabilities of the mobile station (UE).

Defining $L_i$ as the set of RS ports assigned to the $i^{th}$ transmission setting for the transmission group, in some embodiments, a fixed number of RS (e.g., $L_1$ ports) are allocated to the first transmission setting. If scheduled data based on these transmission settings is to be received by the mobile station (UE) substantially simultaneously, the following condition should be satisfied:

$$\sum_{n=2}^{N} L_n = L - L_1 (L_n \geq 1),$$

where L is the maximum number of RS the UE supports. Taking into account the UE's capability with regards to the maximum number of RS it can support, the total number of RS assigned to each transmission setting, when summed together should not exceed $L-L_1$ in some embodiments, where L is the maximum supported RS and $L_1$ is the number of RS allocated to the first transmission setting. The remaining transmission settings may be configured according to the properties of the corresponding transmission group. In some embodiments the maximum number of RS the UE supports may be reported to the wireless network.

FIG. 3 also illustrates some embodiments of the allocating of RS resources to the various transmission settings in the transmission group. In FIG. 3, the various antenna ports 302 correspond to the overall set of reference signals (RS) 300. For example in some embodiments there may be a one-to-one correspondence between antenna ports and reference signals. There are N 314, 316, . . . , 318 transmission settings that need defining, each with its corresponding control information set 324, 326, . . . , 328. For the $n^{th}$ transmission setting, $W_n$ ports (with each port having its corresponding RS) 304, 306, . . . , 308 are assigned to each transmission setting. In some embodiments, each of the ports in the RS pool is assigned to exclusively to one of the transmission settings. The transmission settings within each transmission group may refer to the various settings and options in the wireless system including for example Control (RRC) configuration, MAC configuration, Downlink Control Information (DCI) format, the related search space, and/or the corresponding transmission scheme of the PUSCH/PUCCH corresponding to the associated PDCCH, which takes into account the MIMO capabilities of the mobile station (UE).

Defining Was the set of RS ports assigned to the $i^{th}$ transmission setting for the transmission group, in some embodiments, a fixed number of RS (e.g., $W_1$ ports) are allocated to the first transmission setting. If scheduled UL data based on these transmission settings is to be transmitted by the mobile station (UE) substantially simultaneously, the following condition should be satisfied:

$$\sum_{n=2}^{N} W_n = W - W_1 (W_n \geq 1),$$

where W is the maximum number of RS the UE supports. Taking into account the UE's capability with regards to the maximum number of RS it can support, the total number of RS assigned to each transmission setting, when summed together should not exceed $W-W_1$ in some embodiments, where W is the maximum supported RS and $W_1$ is the number of RS allocated to the first transmission setting. The remaining transmission settings may be configured according to the properties of the corresponding transmission group. In some embodiments the maximum number of RS the UE supports may be reported to the wireless network.

In some embodiments, transmission settings may be configured according to the properties of the transmission group with the RS ports allocation based on semi-persistent coordination among the corresponding transmission units. If scheduled data based on these transmission settings is to be received by the mobile station (UE) substantially simultaneously, the following condition should be satisfied:

$$\sum_{n=1}^{N} L_n = L; (L_n \geq 1),$$

where L is the maximum number of RS ports the UE supports. In some embodiments, the UE may report the maximum number of RS ports it supports for each PDSCH separately or together with the overall maximum number of RS ports it supports. Additionally, in some embodiments semi-persistent coordination may allow the mobile station (UE) to receive data on the PDSCH according to the pre-configured periodicity in the semi-persistent coordination configuration.

In some embodiments, transmission settings may be configured according to the properties of the transmission group with the RS allocation based on semi-persistent coordination among the corresponding transmission units. If scheduled UL data based on these transmission settings is to be transmitted by the mobile station (UE) substantially simultaneously, the following condition should be satisfied:

$$\sum_{n=1}^{N} W_n = W; (W_n \geq 1),$$

where W is the maximum number of RS ports the UE supports. In some embodiments, the UE may report the maximum number of RS it supports for each PUSCH separately or together with the overall maximum number of RS it supports. In some embodiments, the maximum number of RS the UE supports may be reported to the wireless network. Additionally, in some embodiments semi-persistent coordination may allow the mobile station (UE) to transmit data on the PUSCH/PUSCH according to the pre-configured periodicity in the semi-persistent coordination configuration.

In some embodiments, transmission settings may be configured according to the properties of the transmission group with the RS ports allocation based on semi-persistent coordination among the corresponding transmission units. If scheduled data based on these transmission settings is to be received by the mobile station (UE) substantially simultaneously, the following condition should be satisfied:

$$L_n \leq L_n^T$$

and $$\sum_{n=1}^{N} L_n^T = L;$$

$$(L_n \geq 1),$$

where L is the maximum number of RS ports the UE supports and $L_n^T$ is the maximum number of ports(s) the UE can support for the $n^{th}$ PDSCH/PDCCH from the corresponding TRU.

In some embodiments, transmission settings may be configured according to the properties of the transmission group with the RS allocation based on semi-persistent coordination among the corresponding transmission units. If scheduled UL data based on these transmission settings is to be transmitted by the mobile station (UE) substantially simultaneously, the following condition should be satisfied:

$$W_n \leq W_n^T$$

and $$\sum_{n=1}^{N} W_n^T = W; (W_n \geq 1),$$

where W is the maximum number of RS ports the UE supports and $W_n^T$ is the maximum number of RS ports the UE can support for the $n^{th}$ PUSCH/PUCCH to the corresponding TRU.

In some embodiments, the RS allocations for each transmission setting can be jointly done with other components within the same transmission settings. For example, in case that number of layers are configured in each transmission setting, for RS allocation, the following condition should be satisfied: $L_n \leq H_n$.

In some embodiments, the RS allocations for each transmission setting can be jointly done with other components within the same transmission settings. For example, in case that number of layers are configured in each transmission setting, for RS allocation, the following condition should be satisfied: $W_n \leq E_n$.

In some embodiments, the allocation of $L_n$ RS's ports for $n^{th}$ transmission setting can be further divided into $S_n(L_n \geq S_n \geq 1)$ sub-groups and within the $i^{th}$ group $G_i(1 \leq G_i \leq W_n)$ and $$\left(\sum_{i=1}^{S_n} G_i \leq W_n\right)$$

RS's are included. RS ports within one sub-group may assume QCL properties are in existence. Mobile station (UE) is allowed to derive/assume/utilize the large scale channel properties as measured on one antenna port to be applicable to the associated QCL antenna port (e.g. the channel estimate based on port A can be used for port B at the UE). The large scale channel properties that may be considered includes one or more but is not limited to: Doppler spread, Doppler shift, delay spread, average delay, average gain, and/or spatial parameters.

In some embodiments, the allocation $W_n$ RS's ports for $n^{th}$ transmission setting can be further divided into $P_n(W_n \geq P_n \geq 1)$ sub-groups, and within $i^{th}$ group $X_i(1 \leq X_i \leq W_n)$ and $$\left(\sum_{i=1}^{P_n} X_i \leq W_n\right)$$

RS's are included. RS ports within one sub-group may assume QCL properties are in existence. Base station (gNB) is allowed to derive/assume/utilize the large scale channel properties as measured on one antenna port to be applicable to the associated QCL antenna port (e.g. the channel estimate based on port A can be used for port B at the gNB). The large scale channel properties that may be considered includes one or more but is not limited to: Doppler spread, Doppler shift, delay spread, average delay, average gain, and/or spatial parameters.

Figures 1, 4:
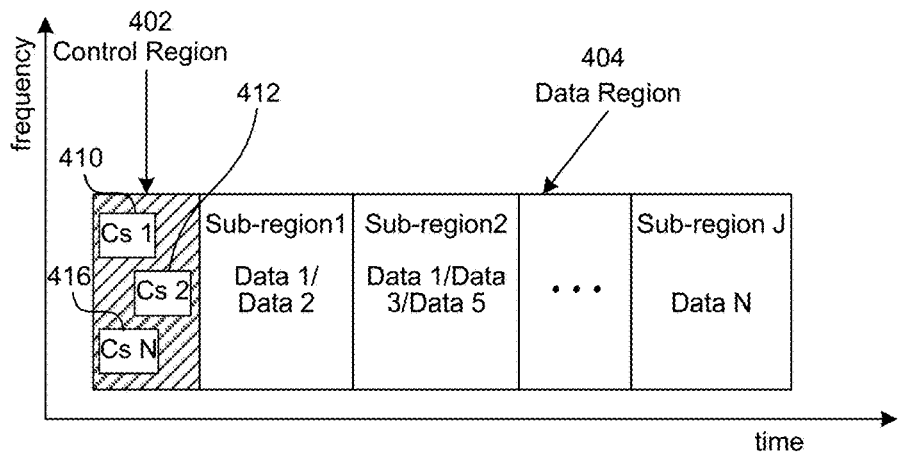
Figures 2, 4:
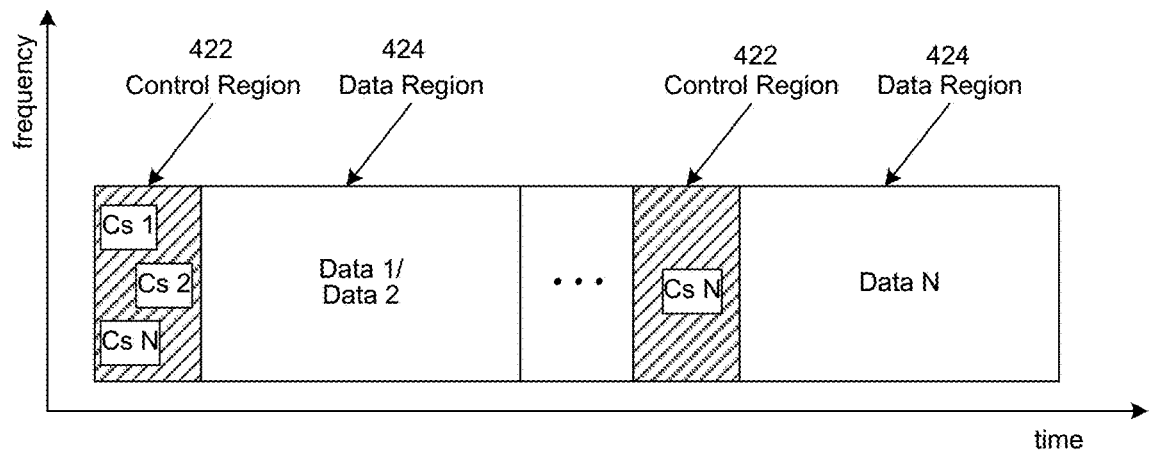

In some embodiments, the resource for transmission can be configured within corresponding transmission settings independently or based on semi-persistent coordination among the corresponding transmission units. FIG. 4-1 illustrates an example of the scheduled resource for each control information set, where the downlink channel is divided into a control region 402 and a data region 404. In the control region, the various control information sets 410, 412, ..., 416 are transmitted. The data region is further sub-divided into sub-regions indexed from 1 to J. In some embodiments the start position of the resources assigned to each data sub-region may be jointly determined by a function based at least in part on the total number of resources in the data region and the transmission unit index. As illustrated, a data sub-region may span across multiple resource elements in the time-frequency space and need not necessarily be contiguous in either time or frequency. In some embodiments, the data sub-region mapping may be incorporated as part of the transmission settings or control information set to indicate which of the possible J data sub-regions have been allocated for the data scheduled by the corresponding control information set (e.g., data 1 scheduled by CS 1 (410)). This may be accomplished via a variety of data structures, including but not limited to a bit-vector map, linked list, hashing function, variable length fields, variable field numbers, etc. In some embodiments, the allocation of data sub-regions from various transmission units may be done by pre-defined rules known apriori to both the transmission units and the mobile station (UE). In some embodiments, as illustrated by FIG. 4-2, the allocation of data 424 and control regions 422 from various transmission units may be done by pre-defined rules known apriori to both the transmission units and the mobile station (UE).

Figures 1, 16:
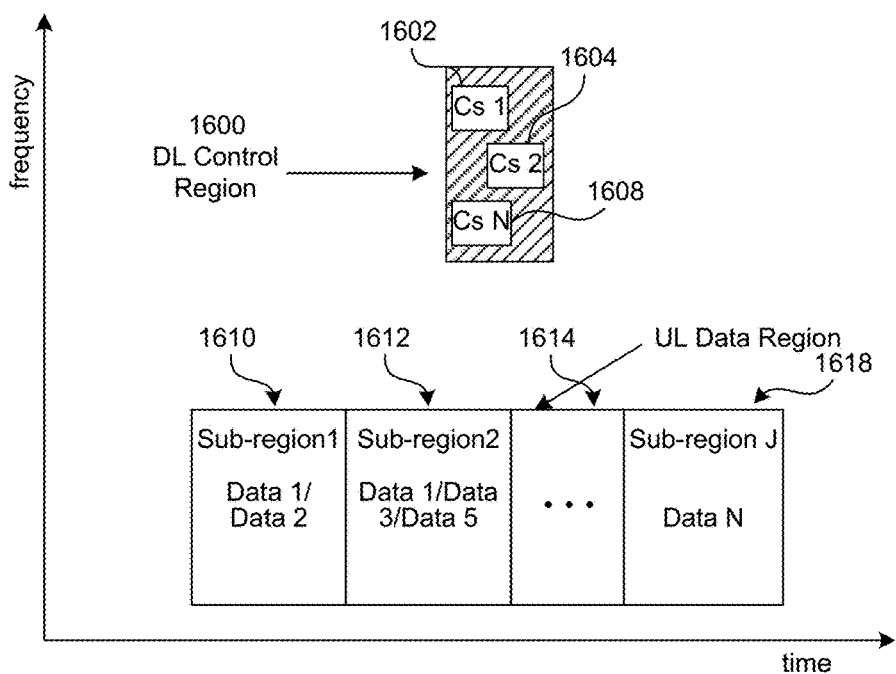
Figures 2, 16:
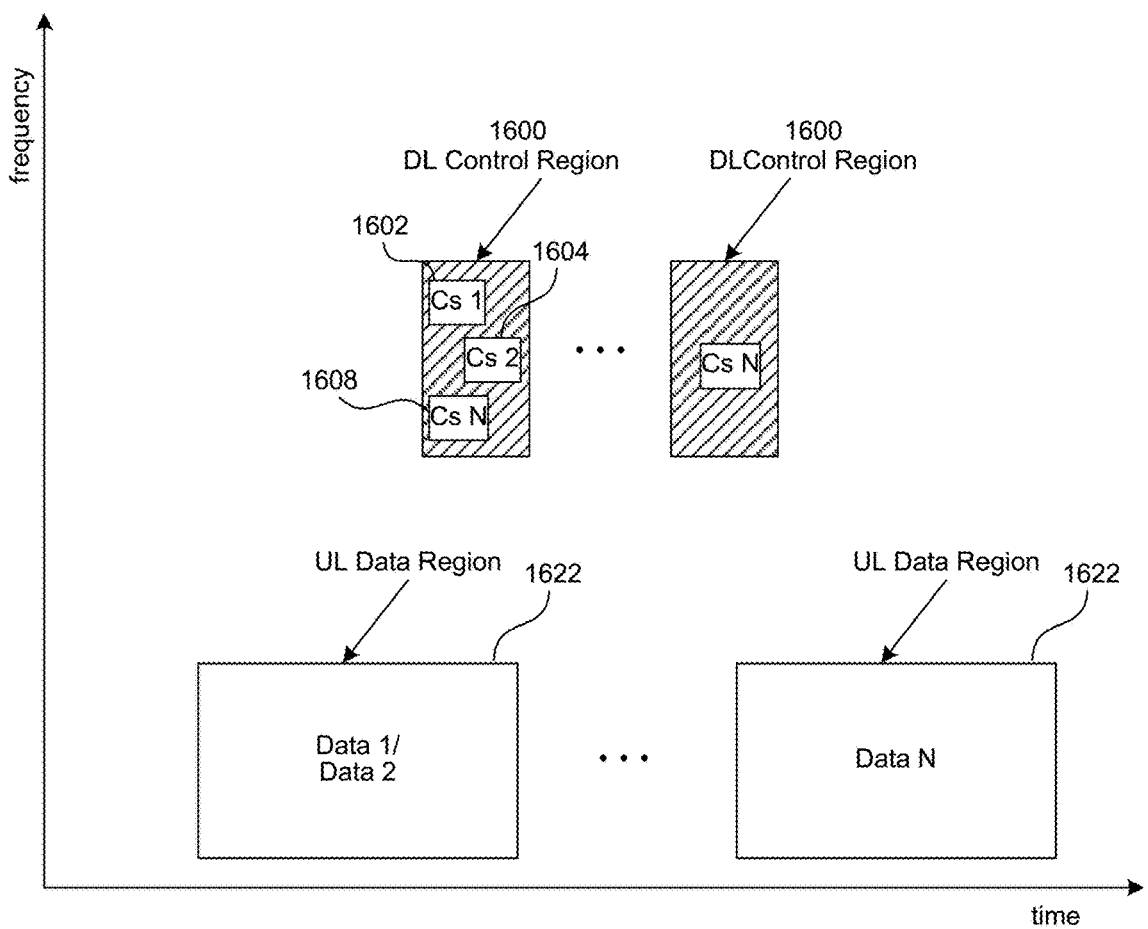

In some embodiments, the resource for transmission can be configured within corresponding transmission settings independently or based on semi-persistent coordination among the corresponding transmission units. FIG. 16-1 illustrates an example of the scheduled resource for each control information set. In the control region of DL channel, the various control information sets 1602, 1604, ..., 1608 are transmitted. The data region of the UL channel is further sub-divided into sub-regions 1610, 1612, 1614, ..., 1618 indexed from 1 to J. In some embodiments the start position of the resources assigned to each data sub-region may be jointly determined by a function based at least in part on the total number of resources in the data region and the transmission unit index. As illustrated, a data sub-region may span across multiple resource elements in the time-frequency space and need not necessarily be contiguous in either time or frequency. In some embodiments, the data sub-region mapping may be incorporated as part of the transmission settings or control information set to indicate which of the possible J data sub-regions have been allocated for the data scheduled by the corresponding control information set (e.g., data 1 scheduled by CS 1 (1602)). This may be accomplished via a variety of data structures, including but not limited to a bit-vector map, linked list, hashing function, variable length fields, variable field numbers, etc. In some embodiments, the allocation of data sub-regions from various transmission units may be done by pre-defined rules known apriori to both the transmission units and the mobile station (UE). In some embodiments, as illustrated by FIG. 16-2, the allocation of UL data region 1622 from various transmission units may be done by pre-defined rules known apriori to both the transmission units and the mobile station (UE). In some embodiments utilizing a time division duplexing (TDD) scheme, the DL control region and UL data region are transmitted in a time division multiplexed manner. In some embodiments utilizing a frequency division duplexing (FDD) scheme, the DL control region and UL data region are transmitted on different carriers.

Figure 5:
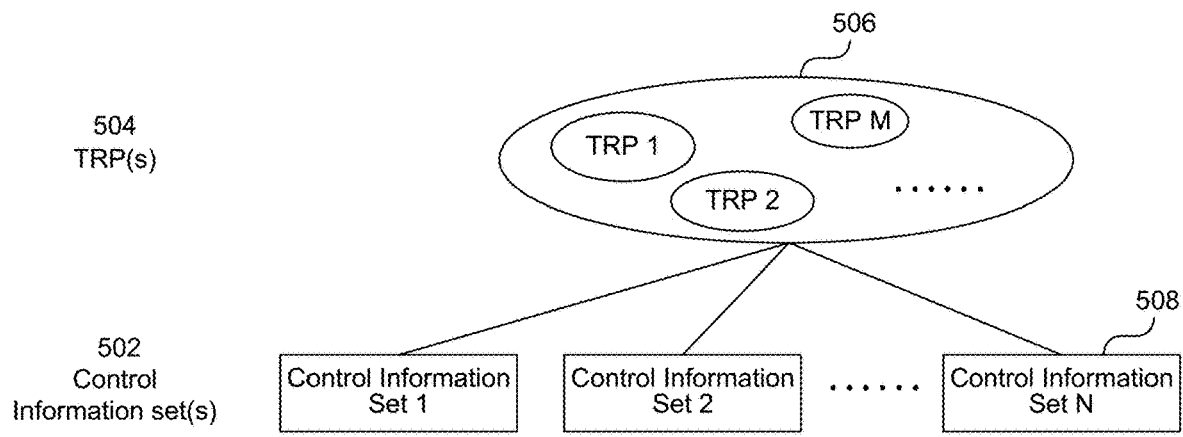
FIG. 5 shows an example of mapping between the control information set and the corresponding transmission point(s).

Additionally, as illustrated in FIG. 5, the mobile station may be able to determine the association between each control information set 502 and the corresponding transmission unit, which in turn indicates the corresponding transmission point(s) 504. FIG. 5 shows M transmission units 506 associated with N 508 control information sets.

In some embodiments, to distinguish the control information set from different transmission units, a transmission indicator field is part of the control information set that the mobile station is responsible for blindly demodulating and decoding. In some embodiments the transmission indicator field is interpreted as a unsigned integer whose numerical value indicates the associated transmission unit indexed from 1 to N. In some embodiments N represents the maximum supported number of control information sets supported by the UE within a single scheduled time, even if not all control information sets are transmitted. In other embodiments, N represents the total number of transmitted control information sets within a single scheduled time for the UE. In some embodiments the value of N may be signaled to the UE by higher layer signaling. The length of the transmission unit indicator field in number of bits may be calculated as ceiling[log 2 (N)], where N is described as above. In some embodiments, the allocated time-frequency space for these control information sets are non-overlapping. In some embodiments, the allocated time-frequency space for these control information sets are overlapping. Table 1, shows an exemplary mapping of the transmission unit indicator field, where N is 4.

TABLE 1

Example Transmission Unit Indicator Field

| Transmission Unit Indicator Field | Transmission Unit Index |
|---|---|
| 00 | 1 |
| 01 | 2 |
| 10 | 3 |
| 11 | 4 |

Figure 6:
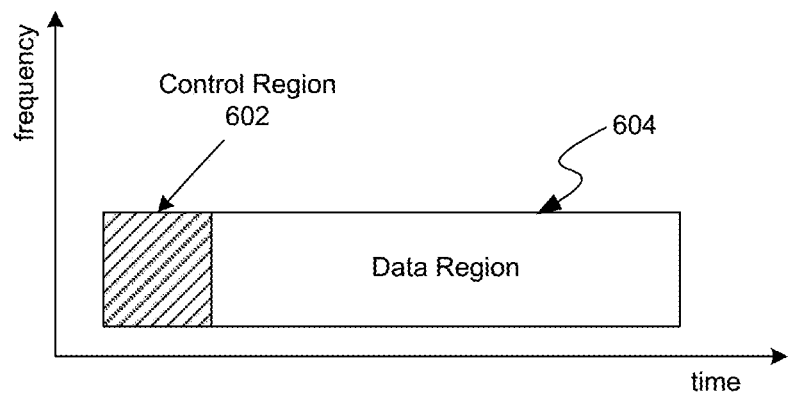
FIG. 6 shows an example of division of the downlink channel into a control region and a data region.

As illustrated in FIG. 6, in another embodiment to distinguish the control information set from different transmission units, the control information sets are assigned resources in the time frequency grid by a pre-determined manner known apriori to the mobile station (UE). As illustrated in FIG. 6, the downlink channel is divided into two regions, a control region 602 and a data region 604. The control region contains all the control information sets.

Figure 7:
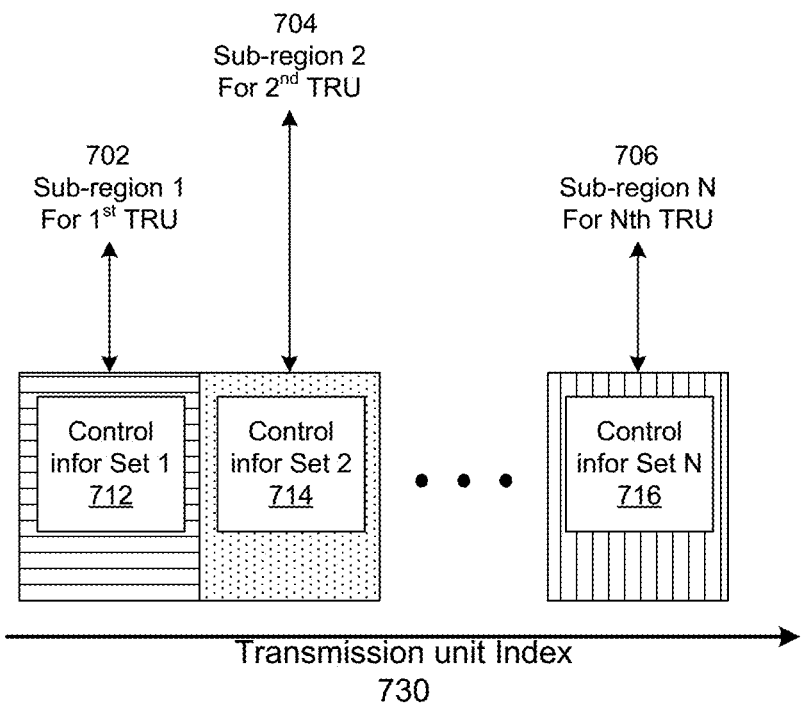
FIG. 7 shows a division of the control region of FIG. 6.

As illustrated in FIG. 7, in yet another embodiment to distinguish the control information sets from different transmission units, the control region of FIG. 6 is further subdivided into control sub-regions indexed from 1 to N 702, 704, . . . , 706, where N refers to the total number of control information sets within a single scheduled time for the mobile station (UE). As illustrated, each control sub-region is allocated to transmit a control information set 712, 714, . . . , 716 scheduled by the corresponding transmission unit. In some embodiments, the start position of the downlink channel resources belonging to each control sub-region may be jointly determined by a function based at least in part on the total number of resources in the control region and the transmission unit index 730. As illustrated a control sub-region may span across multiple resource elements in the time frequency space and need not necessarily be contiguous in time or frequency. In other embodiments, the allocated downlink resources by a control information set scheduled for a transmission unit may be based at least in part on the size (number of information bits) of the control information set. In other embodiments, the allocated downlink resources by a control information set scheduled for a transmission unit may be based at least in part on the link quality between the mobile station (UE) and the associated transmission point within the transmission unit.

Figure 8:
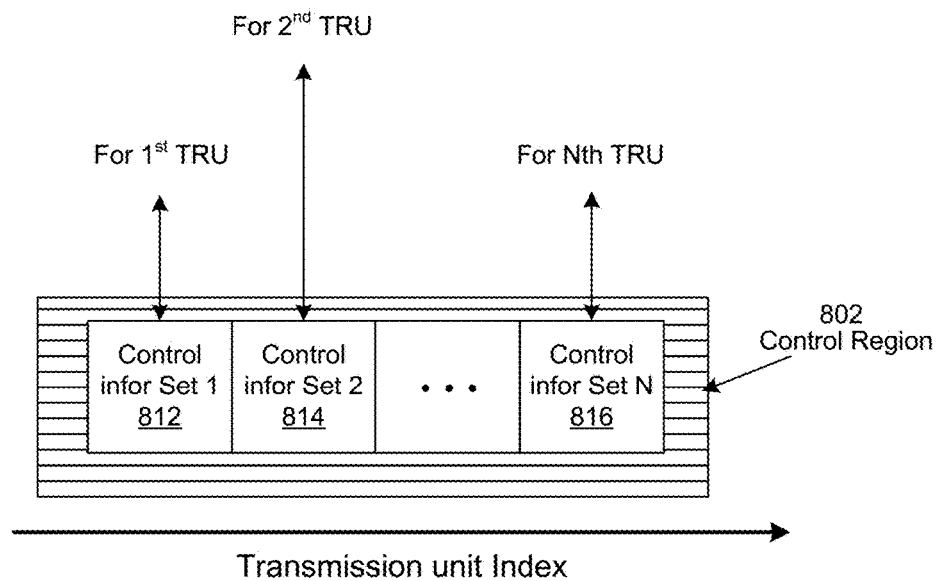
FIG. 8 shows an example of mapping between the control information set and the corresponding transmission unit.

As illustrated in FIG. 8, in yet another embodiment to distinguish the control information sets that correspond to the scheduled data, the control region 802 is assigned to the host transmission unit that transmits the control information sets 812, 814, . . . , 816 for all N transmission units. If a single control information set requires j downlink resources and there are N control information sets, then as illustrated the control region requires at least j*N downlink resources. In some embodiments, the mapping of control information sets may be determined by a pre-defined rule known apriori to the mobile station (UE), such as ascending or descending order. In other embodiments, the mapping of control information sets may be configured by higher layer signaling to the mobile station (UE). In yet another embodiment, the start position of the scheduled downlink channel resource scheduled to a control information set may be jointly determined by a function based at least in part on the total number of resources in the control region and the transmission unit index.

Figure 9:
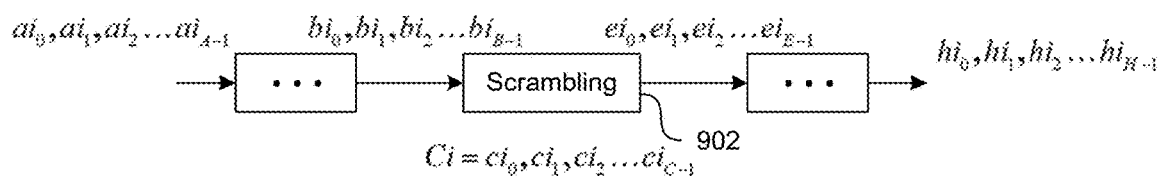
FIG. 9 shows information bit-level processing for the control information set through a data scrambler.

As illustrated in FIG. 9, in yet another embodiment to distinguish the control information sets from transmission units, the control information sets may be scrambled by a scrambler 902 by different scrambling sequences. In some embodiments, as illustrated in FIG. 9, the information bits that correspond to the control information set are scrambled by a sequence that is initialized by the transmission unit index. In some embodiments, the parameters of the scrambling sequence including but not limited to its structure (additive/multiplicative), generation, length, fundamental polynomial, initial state, etc. may be communicated to the mobile station (UE) via higher layer signaling. In some embodiments, the allocated time-frequency space for these control information sets are non-overlapping. In some embodiments, the allocated time-frequency space for these control information sets are overlapping.

Figure 10:
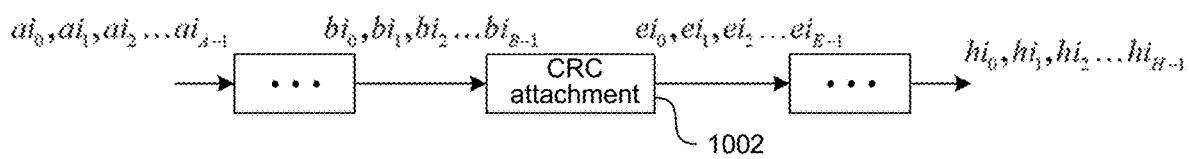
FIG. 10 shows an example implementation of information bit-level processing for the control information set by augmenting the data with a cyclic redundancy check (CRC) sequence.

As illustrated in FIG. 10, in yet another embodiment to distinguish control information sets from transmission units, the control information sets may be augmented by a cyclic redundancy check (CRC) generated by CRC generator block 1002. In some embodiments the CRC alone may be further scrambled as indicated by similar processing as described above and illustrated in FIG. 9, prior to augmenting the control information sets. In yet other embodiments, the scrambling sequence used to scramble the CRC may be jointly determined by a function based at least in part on the transmission unit index or the UE identifier, such as the radio network temporary identifier (RNTI), or a combination of both the transmission unit index and the UE identifier. In other embodiments the parameters of the CRC including but not limited to its length, generator polynomial, initial state, bit-order, byte order, endianness, etc. may be communicated to the mobile station (UE) via higher layer signaling. In some embodiments, the allocated time-frequency space for these control information sets are non-overlapping. In some embodiments, the allocated time-frequency space for these control information sets are overlapping.

In yet another embodiment to distinguish control information sets from transmission units, the control information sets may be further associated together based on quasi co-location (QCL) of antenna ports. Antenna ports may be referred to as QCL if the mobile station (UE) is allowed to derive/assume/utilize the large scale channel properties as measured on one antenna port to be applicable to the associated QCL antenna port (e.g. the channel estimate based on port A can be used for port B at the UE). The large scale channel properties that may be considered includes one or more but is not limited to: Doppler spread, Doppler shift, delay spread, average delay, average gain, and/or spatial parameters.

In yet another embodiment, multiple demodulation reference signals (DMRS) used to demodulate the control information may be grouped in a resource set with respect to one or more large scale channel properties at either the mobile station (UE) or the base station (eNB/gNB). In another embodiment, the overhead synchronization signal (SS) and the DMRS resources are grouped together within a resource set with respect to one or more large scale channel properties.

Figure 11:
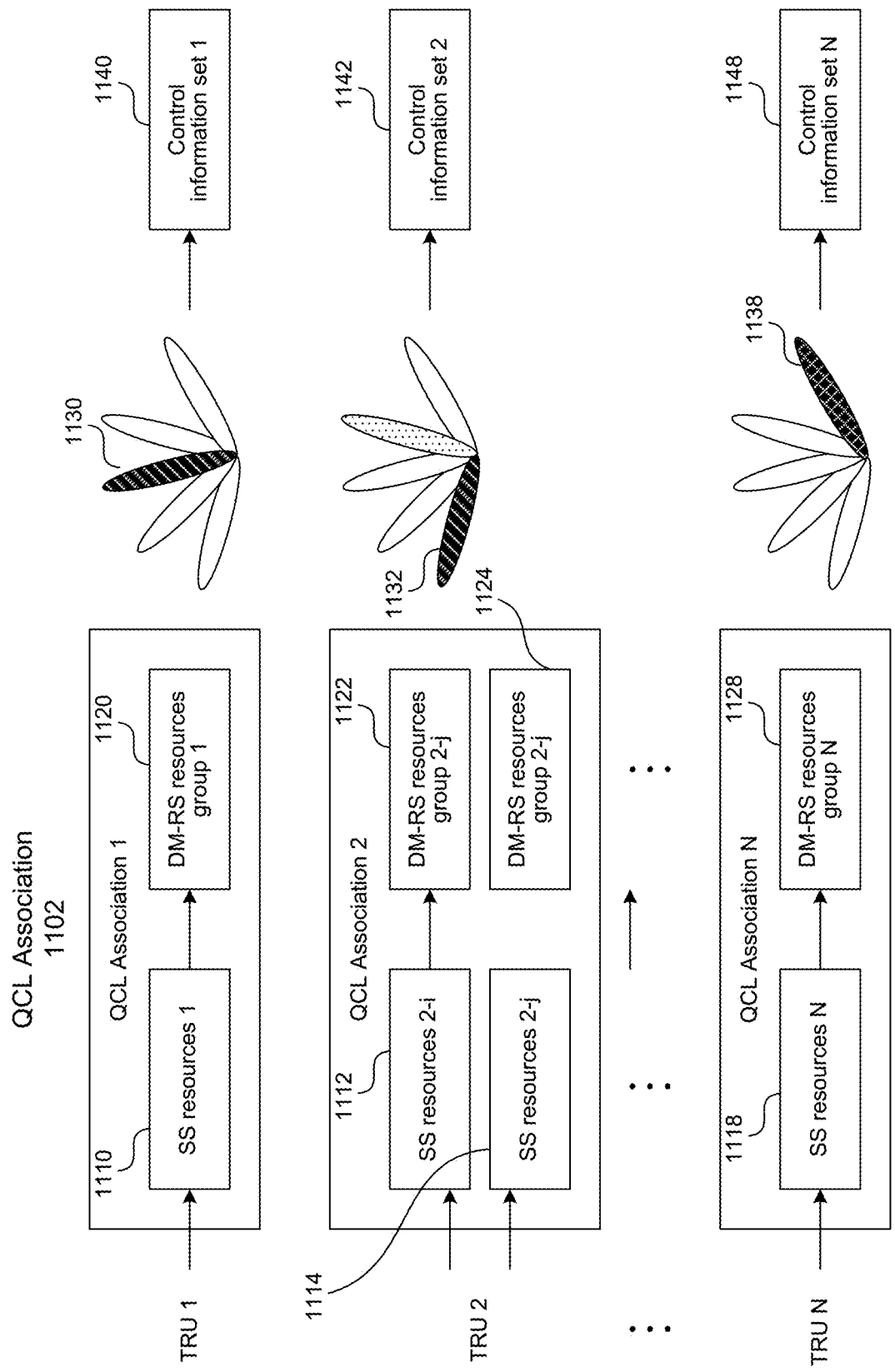
FIG. 11 shows an exemplary reception of control information sets based on quasi colocation of antenna ports.

In some embodiments, the overhead channel state information reference signal (CSI-RS) and the DMRS resources are grouped together within a resource set with respect to one or more large scale channel properties. In some embodiments, the SS may be used as the reference for the DMRS when the DMRS is transmitted from the same TRP as the SS. In some embodiments, the CSI-RS may be used as the reference for the DMRS when the DMRS is transmitted from the same TRP as the CSI-RS. In other embodiments, the SS may be used as the reference for the DMRS when the DMRS is transmitted from the same TRP and has similar transmit (Tx) beams as the SS. In other embodiments, the CSI-RS may be used as the reference for the DMRS when the DMRS is transmitted from the same TRP and has similar transmit (Tx) beams as the CSI-RS. In some embodiments, the channel properties may be pre-defined, while in other embodiments the information regarding the channel properties may be signaled by higher layer signaling. In some embodiments, the allocated time-frequency space for these control information sets are non-overlapping. In some embodiments, the allocated time-frequency space for these control information sets are overlapping. As illustrated in FIG. 11, in an exemplary embodiment, there are N QCL associations (1102) between SS resources 1110, 1112, . . . , 1118 and the DMRS 1120, 1122, . . . , 1128 configured to the mobile station (UE). The UE selects the proper analog beam 1130, 1132, . . . , 1138 based on the configured QCL association to detect, demodulate, and decode the associated control information sets 1140, 1142, . . . , 1148.

Figure 12A:
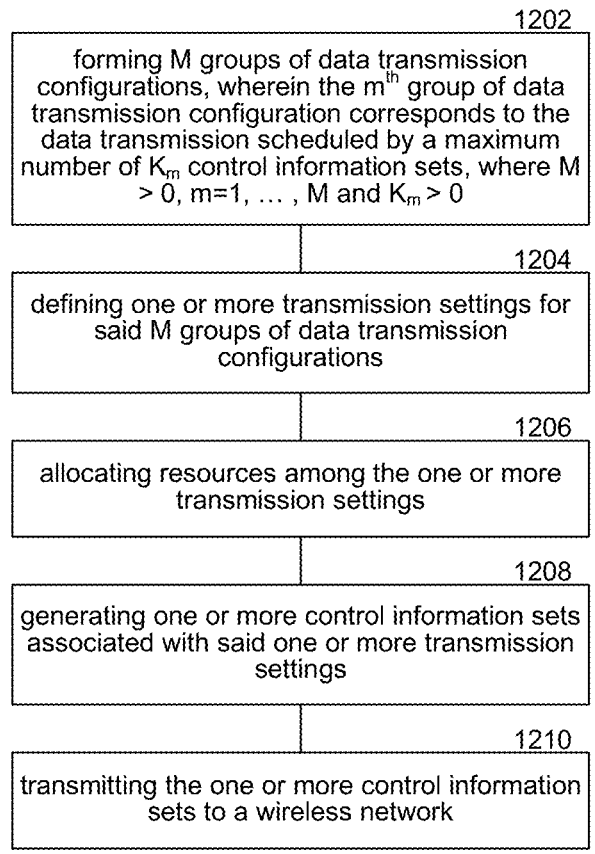
FIG. 12A shows a flowchart of an example process of wireless communications.

As illustrated in FIG. 12A, in an exemplary embodiment, a wireless communication method includes: forming M groups of data transmission configurations, wherein the $m^{th}$ group of data transmission configuration correspond to the data transmission scheduled by maximum number of $K_m$ control information sets, where M>0, m=1, . . . , M and $K_m$>0 (1202), defining one or more transmission settings for said M groups of data transmission configurations (1204), allocating number of data layers among the one or more transmission settings (1206), generating one or more control information sets associated with said one or more transmission settings (1208), transmitting the one or more control information sets to a wireless network (1210).

Figure 12B:
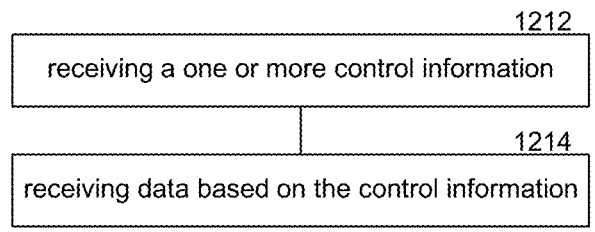
FIG. 12B shows a flowchart of an example process of wireless communications.

As illustrated in FIG. 12B, in an exemplary embodiment, a wireless communication method includes: receiving a one or more control information, receiving data based on the control information.

Figure 14:
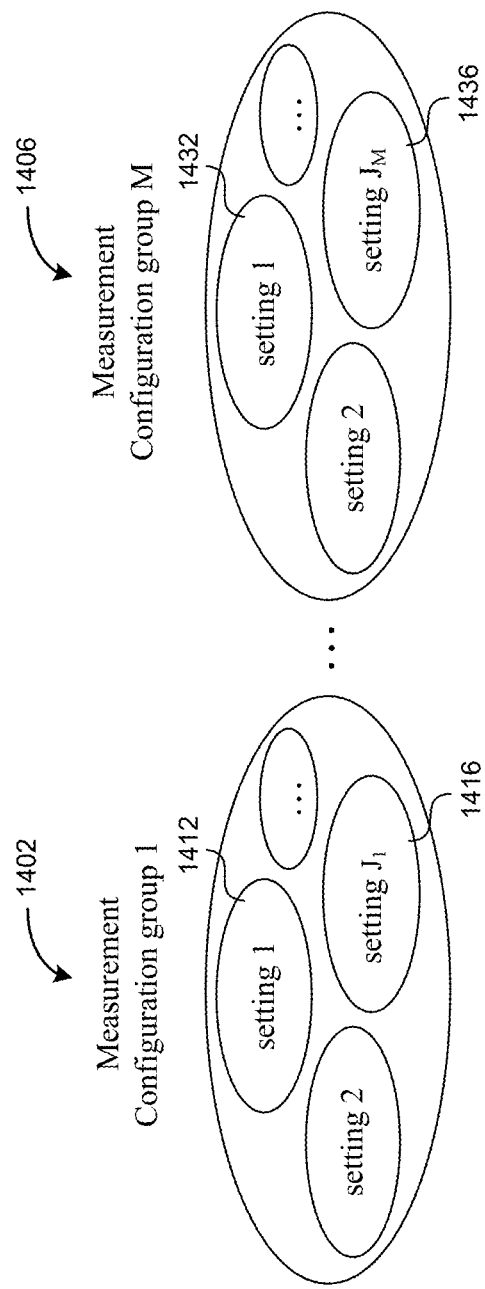
FIG. 14 shows an exemplary formation of measurement configuration groups defining settings as needed within each group.

FIG. 14, in an exemplary embodiment to support the reception of multiple PDCCH's and the calculation of channel state information, illustrates the forming of measurement configuration groups 1402, . . . , 1406, defining settings 1412, . . . , 1416, . . . , 1432, . . . , 1436.

In some embodiments, only one measurement group is formed. Furthermore, in some embodiments defining the parameters of the settings within a measurement group may be done jointly across the group. In other embodiments the parameters of the settings within a measurement group may be done independently. In some embodiments, the setting may include RS settings to facilitate channel state information measurement or beam management. In some embodiments, the setting may include the report settings including but not limited to: channel state information reporting and beam management results reporting.

In some embodiments allocating of the settings from one measurement group to different control information sets can be done jointly based on UE's capability. For example in some embodiments, there are J settings that need to be allocated to N control information sets. The settings within each measurement group may refer to the various settings and options in the wireless system including for example Radio Resource Control (RRC) configuration, MAC configuration, Downlink Control Information (DCI) format, the related search space, and/or the corresponding transmission scheme of the PDSCH corresponding to the associated PDCCH, which takes into account the MIMO capabilities of the mobile station (UE).

Figure 15:
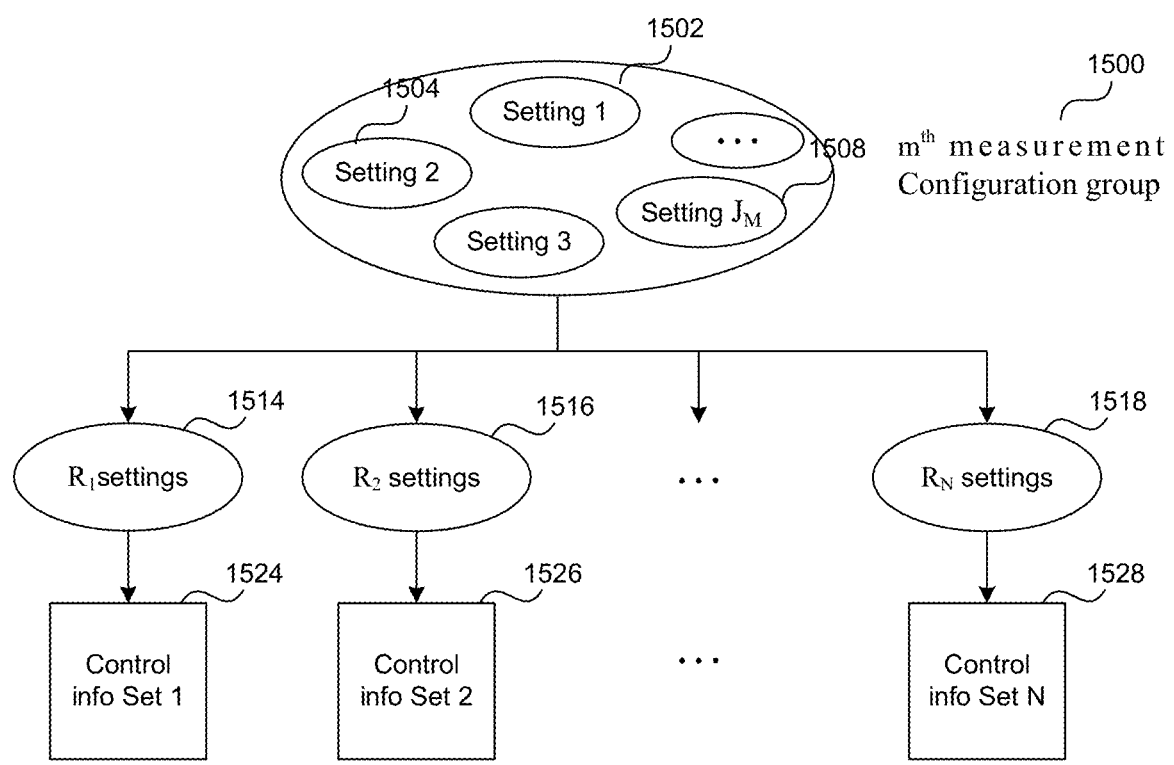
FIG. 15 shows an exemplary allocation of various settings within one measurement configuration group among the control information sets.

FIG. 15 illustrates some embodiments of the allocating of settings to different control resource sets. There are $J_m$ 1502, 1504, . . . , 1508 settings that need to be allocated to N control information sets. For the $n^{th}$ control information set, $R_n$ settings are assigned. In some embodiments, each of the settings in the measurement configuration group is assigned to exclusively one of the control information set. The settings within each measurement configuration group may refer to the various settings and options in the wireless system including for example Radio Resource Control (RRC) configuration, MAC configuration, Downlink Control Information (DCI) format, the related search space, and/or the corresponding transmission scheme of the PDSCH corresponding to the associated PDCCH, which takes into account the MIMO capabilities of the mobile station (UE).

Defining $R_i$ as the set of settings assigned to the $i^{th}$ control information set, in some embodiments, settings may be allocated independently or based on semi-persistent coordination among the corresponding transmission units. If channel measurements based on these settings are to be conducted by the mobile station (UE) substantially simultaneously, the following condition should be satisfied:

$$\sum_{n=1}^{N} R_n = R; (R_n \geq 1),$$

where R is the maximum number of settings the UE supports. In some embodiments, the UE may report the maximum number of settings it supports for each PDCCH separately or together with the overall maximum number of settings it supports. Additionally, in some embodiments semi-persistent coordination may allow the mobile station (UE) to conduct channel measurements according to the pre-configured periodicity in the semi-persistent coordination configuration.

In some embodiments, settings may be allocated independently or based on semi-persistent coordination among the corresponding transmission units. If channel measurements based on these settings are to be conducted by the mobile station (UE) substantially simultaneously, the following condition should be satisfied:

$$R_n \leq R_n^T \text{ and } \sum_{n=1}^{N} R_n^T = R; (R_n \geq 1),$$

where R is the maximum number of settings the UE supports and $R_n^T$ is the maximum number of settings the UE can support for channel measurements based on the $n^{th}$ PDSCH from the corresponding TRU.

Figure 17:
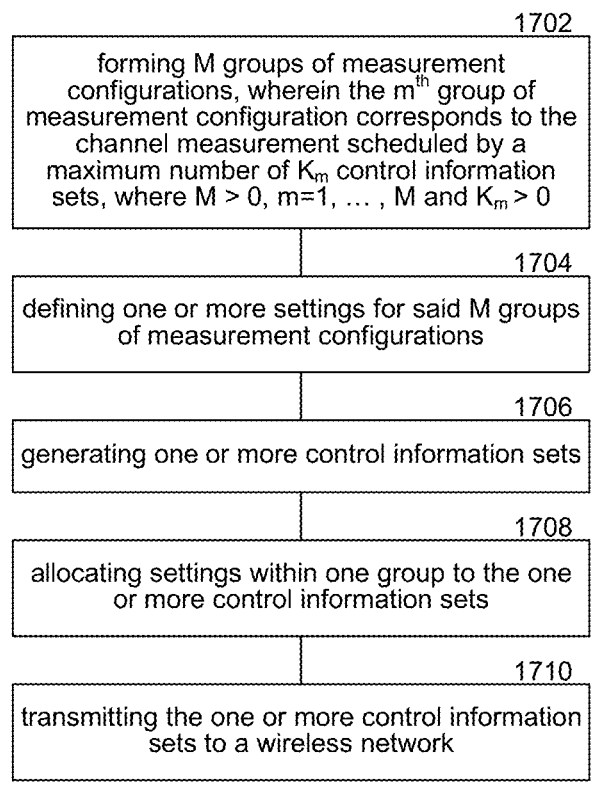
FIG. 17 shows a flowchart of an example process of wireless communications.

As illustrated in FIG. 17, in an exemplary embodiment, a wireless communication method includes: forming M groups of measurement configurations, wherein the $m^{th}$ group of measurement configuration corresponds to the channel measurement scheduled by a maximum number of $K_m$ control information sets, where M>0, m=1, . . . , M and $K_m$>0 (1702), defining one or more settings for said M groups of measurement configurations (1704), generating one or more control information sets (1706), allocating settings within one group to the one or more control information sets (1708), transmitting the one or more control information sets to a wireless network (1710).

Figure 18:
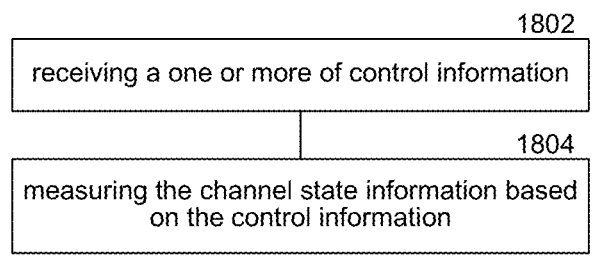
FIG. 18 shows a flowchart of an example process of wireless communications.

As illustrated in FIG. 18, in an exemplary embodiment, a wireless communication method includes: receiving a one or more control information (1802), measuring the channel state information based on the control information (1804).

Figure 19:
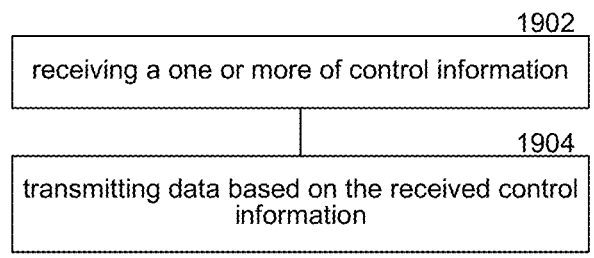
FIG. 19 shows a flowchart of an example process of wireless communications.

As illustrated in FIG. 19, in an exemplary embodiment, a wireless communication method includes: receiving a one or more control information (1902), transmitting data based on the received control information (1904).

In some embodiments, the allocation technique of (1206) is based at least in part on allocating the number of data layers. In some embodiments, the forming technique of (1202) is based at least in part on forming the transmission groups based at least in part on different characteristics of transmission techniques. In some embodiments, the defining technique of (1204) is based at least in part on defining a first transmission setting that is always configured within each group of data transmission configurations. In some embodiments, the allocating technique of (1206) is based at least in part on the allocating a number of data layers to the 1st (always-on) transmission configuration by pre-defined rules that are known apriori to both the mobile station and the transmission unit. In some embodiments, the allocating technique of (1206) is based at least in part on allocating the remaining number of data layers for the remaining transmission settings within one group after allocating the always-on transmission setting, that is based at least in part on the mobile station's reported capabilities to process data from the allocated number of data layers. In some embodiments, the allocating technique of (1206) with respect to number of data layers for all transmission settings within one group is based at least in part on the semi-persistent coordination among the corresponding transmission units. In some embodiments, the allocating technique of (1206) with respect to number of data layers for all transmission settings within one group is based at least in part on the mobile station's reported capabilities to process data from the allocated number of data layers.

In some embodiments, the allocating technique of (1206) further comprises signaling dynamically to the mobile station. In some embodiments, the dynamic signaling defines a plurality of data sub-regions in which the sets of control information map scheduled data from corresponding transmission units to data sub-regions in both time and frequency. In some embodiments, the control information set mapping contains at least in part a direct bit map, wherein the length of the bit map corresponds to the total number of sub-regions (N), with a corresponding bit location for each sub-region, and a positive indicator in the bitmap corresponds to the data sub-region containing scheduled data. In some embodiments, the dynamic signaling of the plurality of data sub-regions is based at least in part on the total resources in the data region and the index of the transmission unit. In some embodiments, the dynamic signaling of the plurality of sub-regions is based at least in part on the total resources allocated for each data and the index of the transmission unit. In some embodiments, the control information set mapping is based at least in part on pre-defined fixed rules that are known apriori to both the mobile station and the transmission unit.

In some embodiments, the generating technique of (1208) is based at least in part on the insertion of a transmission unit field corresponding to an index indicating which transmission unit the respective control information set is associated with. In some embodiments, the transmission unit field length is based at least in part on the maximum supported control information sets within a single scheduled time for the mobile station. In some embodiments, the transmission unit field length is based at least in part on the total number of transmitted control sets within a single scheduled time for the mobile station.

In some embodiments, the control information sets of (1208) are grouped together in a control region based at least in part on both a time and frequency grid. In some embodiments, the control information sets are transmitted by the appropriate transmission unit respectively. In some embodiments, the control information set within the time frequency grid's location is determined at least in part by the total resources in the control region and the transmission unit index. In some embodiments, the control information set within the time frequency grid's location is determined at least in part on the size of the control information set and the link quality between the mobile station and the transmission point. In some embodiments, the control information sets are transmitted by a single host transmission unit for all transmission units. In some embodiments, the mapping of the control information sets is based at least in part on a pre-defined rule known apriori to the mobile station and the host transmission unit. In some embodiments, the mapping of the control information sets is based at least in part on signaling between the mobile station and the host transmission unit. In some embodiments, the mapping of the control information sets is based at least in part on the total resources in the control region and the transmission unit index.

In some embodiments, the control information sets of (1208) are scrambled by a scrambling sequence. In some embodiments, the scrambling sequence is initialized based on transmission unit index. In some embodiments, the scrambling sequence is initialized based on signaling from the transmission unit and the mobile station. In some embodiments, the transmission unit index is indicated based on signaling.

In some embodiments, the control information sets of (1208) are augmented by a cyclic redundancy check sequence. In some embodiments, the cyclic redundancy check sequence is based at least in part on the transmission unit index. In some embodiments, cyclic redundancy check sequence is based at least in part on the mobile station identifier.

In some embodiments, the transmitting technique of (1210) is based at least in part on quasi-colocation associations of reference signals to enable receive beamforming with an overhead reference signal. In some embodiments, the quasi-colocation properties are based at least in part on shared channel characteristics such as Doppler spread, Doppler shift, delay spread, average delay, average gain, and/or spatial parameters. In some embodiments, the quasi-colocation properties determine a group based at least in part on the shared channel characteristics of Doppler shift and average delay. In some embodiments, quasi-colocation channel properties determine a group based at least in part on the channel characteristics of Doppler shift, average delay, and/or spatial parameters. In some embodiments, quasi-colocation channel properties are pre-defined. In some embodiments, the quasi-colocation channel properties are signaled to the mobile station.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Only a few implementations and examples are described and other implementations, enhancements and variations can be made based on what is described and illustrated in this disclosure.

What is claimed is:

1. A wireless communication method, comprising:
   determining, by a base station, a transmission setting for a group of data transmission configurations in M groups of data transmission configurations, M being a positive integer, wherein the transmission setting comprises resource information corresponding to multiple transmission units, wherein the transmission setting comprises a transmission scheme of a data channel scheduled by multiple control information sets that correspond to the multiple transmission units; and
   transmitting, by the base station from the multiple transmission units, the multiple control information sets to a mobile station based on the transmission setting,
   wherein each of the multiple control information sets comprises a field including an integer value that indicates a transmission unit of the multiple transmission units associated with a corresponding control information set, wherein a length of the field is indicated in a number of bits that is equal to ceiling [$\log_2(N)$], and wherein N is signaled to the mobile station by the base station; and
   transmitting the data channel to the mobile station based on the transmission scheme corresponding to a control information set of the multiple control information sets.

2. The method of claim 1, wherein each of the multiple control information sets is associated with a respective quasi colocation (QCL) configuration, and wherein the QCL configurations are based on one or more channel properties, the one or more channel properties including at least one of: Doppler spread, Doppler shift, delay spread, average delay, or a spatial parameter.

3. The method of claim 1, wherein a demodulation reference signal is associated with the control information set of the multiple control information sets, and
   wherein a channel-state information reference signal serves as a reference for the demodulation reference signal based on at least one QCL configuration.

4. The method of claim 1, wherein time-frequency resources for the multiple control information sets are overlapping or non-overlapping in a time and frequency domain.

5. A wireless communication method, comprising:
   receiving, by a mobile station, multiple control information sets from multiple transmission units from a base station corresponding to a transmission setting for a group of data transmission configurations in M groups of data transmission configurations, M being a positive integer, wherein the transmission setting comprises resource information corresponding to the multiple transmission units,
   wherein the transmission setting comprises a transmission scheme of a data channel scheduled by the multiple control information sets, and
   wherein each of the multiple control information sets comprises a field including an integer value that indicates a transmission unit of the multiple transmission units associated with a corresponding control information set, wherein a length of the field is indicated in a number of bits that is equal to ceiling [$\log_2(N)$], and wherein N is signaled to the mobile station by the base station; and receiving the data channel from the base station based on the transmission scheme corresponding to a control information set of the multiple control information sets.

6. The method of claim 5, wherein each of the multiple control information sets is associated with a respective quasi-colocation (QCL) configuration, and wherein the QCL configurations are based on one or more channel properties, the one or more channel properties including at least one of: Doppler spread, Doppler shift, delay spread, average delay, or a spatial parameter.

7. The method of claim 5, wherein a demodulation reference signal is associated with the control information set of the multiple control information sets, and wherein a channel-state information reference signal serves as a reference for the demodulation reference signal based on at least one QCL configuration.

8. The method of claim 5, wherein time-frequency resources for the multiple control information sets are overlapping or non-overlapping in a time and frequency domain.

9. An apparatus for wireless communication comprising a processor and a memory storing instructions, execution of which by the processor causes the apparatus to:

determine a transmission setting for a group of data transmission configurations in M groups of data transmission configurations, M being a positive integer, wherein the transmission setting comprises resource information corresponding to multiple transmission units, wherein the transmission setting comprises a transmission scheme of a data channel scheduled by multiple control information sets that correspond to the multiple transmission units; and transmit the multiple control information sets from multiple transmission units to a mobile station based on the transmission setting, wherein each of the multiple control information sets comprises a field including an integer value that indicates a transmission unit of the multiple transmission units associated with a corresponding control information set, wherein a length of the field is indicated in a number of bits that is equal to ceiling [$\log_2(N)$], and wherein N is signaled to the mobile station by the apparatus; and transmit the data channel to the mobile station based on the transmission scheme corresponding to a control information set of the multiple control information sets.

10. The apparatus of claim 9, wherein each of the multiple control information sets is associated with a respective quasi colocation (QCL) configuration, and wherein the QCL configurations are based on one or more channel properties, the one or more channel properties including at least one of: Doppler spread, Doppler shift, delay spread, average delay, or a spatial parameter.

11. The apparatus of claim 9, wherein a demodulation reference signal is associated with the control information set of the multiple control information sets, and wherein a channel-state information reference signal serves as a reference for the demodulation reference signal based on at least one QCL configuration.

12. The apparatus of claim 9, wherein time-frequency resources for the multiple control information sets are overlapping or non-overlapping in a time and frequency domain.

13. An apparatus for wireless communication comprising a processor and a memory storing instructions, execution of which by the processor causes the apparatus to:

receive multiple control information sets from multiple transmission units from a base station corresponding to a transmission setting for a group of data transmission configuration in M groups of data transmission configurations, M being a positive integer, wherein the transmission setting comprises resource information corresponding to the multiple transmission units, wherein the transmission setting comprises a transmission scheme of a data channel scheduled by the multiple control information sets, and wherein each of the multiple control information sets comprises a field including an integer value that indicates a transmission unit of the multiple transmission units associated with a corresponding control information set, wherein a length of the field is indicated in a number of bits that is equal to ceiling [$\log_2(N)$], and wherein N is signaled to the apparatus by the base station; and receiving the data channel from the base station based on the transmission scheme corresponding to a control information set of the multiple control information sets.

14. The apparatus of claim 13, wherein each of the multiple control information sets is associated with a respective quasi colocation (QCL) configuration, and wherein the QCL configurations are based on one or more channel properties, the one or more channel properties including at least one of: Doppler spread, Doppler shift, delay spread, average delay, or a spatial parameter.

15. The apparatus of claim 13, wherein a demodulation reference signal is associated with the control information set of the multiple control information sets, and wherein a channel-state information reference signal serves as a reference for the demodulation reference signal based on at least one QCL configuration.

16. The apparatus of claim 13, wherein time-frequency resources for the multiple control information sets are overlapping or non-overlapping in a time and frequency domain.

* * * * *

UNITED STATES PATENT AND TRADEMARK OFFICE
CERTIFICATE OF CORRECTION

PATENT NO. : 12,155,605 B2
APPLICATION NO. : 17/666277
DATED : November 26, 2024
INVENTOR(S) : Zhang et al.

Page 1 of 1

It is certified that error appears in the above-identified patent and that said Letters Patent is hereby corrected as shown below:

In the Specification

In Column 2, Line 30, delete "m=1, M" and insert --m=1, . . . , M--

In Column 11, Line 47, delete "Was" and insert --$W_i$--

Signed and Sealed this
Twenty-first Day of January, 2025

Coke Morgan Stewart
*Acting Director of the United States Patent and Trademark Office*